United States Patent [19]
Yoshida et al.

[11] Patent Number: 5,483,661
[45] Date of Patent: Jan. 9, 1996

[54] METHOD OF VERIFYING IDENTIFICATION DATA IN DATA DRIVEN INFORMATION PROCESSING SYSTEM

[75] Inventors: Shinichi Yoshida, Kashihara; Manabu Onozaki, Nara; Tsuyoshi Muramatsu, Tenri, all of Japan

[73] Assignee: Sharp Kabushiki Kaisha, Osaka, Japan

[21] Appl. No.: 208,477

[22] Filed: Mar. 10, 1994

[30] Foreign Application Priority Data

Mar. 12, 1993 [JP] Japan .................................. 5-052075

[51] Int. Cl.⁶ .............................. G06F 15/00; G06F 7/04
[52] U.S. Cl. ..................... 395/800; 364/DIG. 1; 364/242.94; 364/262.2; 364/265; 395/187.01; 395/185.01
[58] Field of Search .................................. 395/800, 200, 395/600, 375, 650, 775, 275, 325, 575, 500, 187.01; 370/94.1–94.3, 85.6, 60, 92; 371/30, 16.5

[56] References Cited

U.S. PATENT DOCUMENTS

| | | | |
|---|---|---|---|
| 4,042,914 | 8/1977 | Curley et al. ........................... | 395/375 |
| 4,719,621 | 1/1988 | May ........................................... | 370/85 |
| 4,783,738 | 11/1988 | Li et al. ................................... | 395/800 |
| 5,008,882 | 4/1991 | Peterson et al. ...................... | 370/94.3 |
| 5,049,881 | 9/1991 | Gibson et al. .......................... | 341/95 |
| 5,101,477 | 3/1992 | Casper et al. .......................... | 395/250 |
| 5,138,615 | 8/1992 | Lamport et al. ........................ | 370/94.1 |
| 5,181,017 | 1/1993 | Frey, Jr. et al. ....................... | 395/200 |
| 5,285,200 | 2/1994 | Kuriyama ............................... | 235/380 |
| 5,345,558 | 9/1994 | Opher et al. ............................ | 395/200 |

OTHER PUBLICATIONS

"An Evaluation of Parellel–Processing in the Dynamic Data–Driven Processors".

*Primary Examiner*—Memmet Geckill

[57] ABSTRACT

In a data driven information processing system including processors which processes datapackets, a method of verifying identification information allocated to the processors includes the following steps: previously specifying a path for a datapacket via the processors; providing the data driven information processing system with information specifying the number of the other processors for the datapacket to pass through until the packet reaches a certain processor from the input of the system in the path, and a datapacket for identification which stores an identification data verification instruction; a first transmission step of transmitting the datapacket for identification to the processor along the specified path while updating information indicating the number of processors and applying the packet to the processor; a step of producing a result datapacket which stores the identification data of the processor for output in the specified path; a second transmission step of transmitting the result datapacket along the specified path for output; and a step of verifying identification data stored in the output result datapacket.

20 Claims, 18 Drawing Sheets

BID TERMINAL = (0, 0)

BID TERMINAL = (0, 1)

BID TERMINAL = (1, 0)

BID TERMINAL = (1, 1)

BID TERMINAL = (0, 0)

BID TERMINAL = (0, 1)

BID TERMINAL = (1, 0)

BID TERMINAL = (1, 1)

|  | COUNT VALUE (k) | COMPARISON VALUE (l) | IDENTITY NUMBER (m) |
|---|---|---|---|
| FIG. 15A | 0 | 3 | 0 |

C:ID VERIFICATION INSTRUCTION

|  | | | |
|---|---|---|---|
| FIG. 15B | 1 | 3 | 0 |

C:ID VERIFICATION INSTRUCTION

|  | | | |
|---|---|---|---|
| FIG. 15C | 2 | 3 | 0 |

C:ID VERIFICATION INSTRUCTION

|  | | | |
|---|---|---|---|
| FIG. 15D | 3 | 3 | PE #1 |

C:ID VERIFICATION INSTRUCTION

|  | | | |
|---|---|---|---|
| FIG. 15E | 4 | 3 | PE #1 |

C:ID VERIFICATION INSTRUCTION

BID TERMINAL =(0,0)

BID TERMINAL =(0,1)

BID TERMINAL =(1,0)

BID TERMINAL =(1,1)

FIG. 21

| SETTINGS FOR SW$_1$, SW$_0$ | ID VERIFICATION TEST MODE | | | NORMAL EXECUTION MODE | |
|---|---|---|---|---|---|
| | 0, 0 (SETTING FOR 0VM SYSTEM) | 0, 1 (SETTING FOR 2VM SYSTEM) | 1, 0 (SETTING FOR 4VM SYSTEM) | 1, 1 SETTING FOR NORMAL EXECUTION MODE | |
| ID# \ BID TERMINAL | (BID$_1$, BID$_0$) | (BID$_1$, BID$_0$) | (BID$_1$, BID$_0$) | (BID$_1$, BID$_0$) | |
| PE#0 | (0, 0) | (1, 1) | (1, 1) | (1, 1) | |
| PE#1 | (0, 0) | (1, 0) | (1, 0) | (1, 1) | |
| PE#2 | (0, 0) | (1, 1) | (1, 1) | (1, 1) | |
| PE#3 | (0, 0) | (1, 0) | (1, 0) | (1, 1) | |
| RT#0 | (*, *) | (1, 0) | (1, 0) | (1, 1) | |
| RT#1 | (*, *) | (1, 1) | (1, 0) | (1, 1) | |
| RT#2 | (*, *) | (1, 0) | (1, 0) | (1, 1) | |
| RT#3 | (*, *) | (*, *) | (1, 1) | (1, 1) | |
| RT#4 | (*, *) | (1, 1) | (1, 1) | (1, 1) | |
| RT#5 | (*, *) | (*, *) | (1, 0) | (1, 1) | |
| RT#6 | (*, *) | (1, 1) | (1, 0) | (1, 1) | |
| RT#7 | (*, *) | (1, 0) | (1, 0) | (1, 1) | |
| RT#8 | (1, 0) | (1, 0) | (1, 0) | (1, 1) | |
| RT#9 | (1, 0) | (1, 0) | (1, 0) | (1, 1) | |

*: DON'T CARE $(SW_1, SW_0) = (0, 0)$ $(SW_1, SW_0) = (0, 1)$ $(SW_1, SW_0) = (1, 0)$

METHOD OF VERIFYING IDENTIFICATION DATA IN DATA DRIVEN INFORMATION PROCESSING SYSTEM

BACKGROUND OF INVENTION

1. Field of the Invention

The present invention relates generally to a system including a number of data driven information processors, and more specifically, to a method of verifying whether or not identification data in each processor included in such a system is preset to a correct value.

2. Description of the Related Art

In a data driven processor, processings proceed in parallel based on the simple rule "when all the data needed for an action are available and necessary resources such as an operation unit for the action are allocated for the action, the action is taken".

FIG. 1 is a block diagram showing a conventional data driven information processing system suitable for video processing. A similar system configuration is suggested in a document entitled "An Evaluation of Parallel Processing in the Dynamic Data Driven Processor" (issued in the Microcomputer Architecture Symposium sponsored by Information Processing Society of Japan, Nov. 12, 1991).

The system shown in FIG. 1 includes a data driven processor 1 and a video memory unit 11.

Video memory unit 11 includes a memory interface 2 and a video memory 3.

Processor 1 has input ports IA, IB and IV, and output ports OA, OB, and OV. Transmission paths 7 and 8 are connected to input ports IA and IB, respectively, and video signals to be processed are applied through transmission paths 7 and 8. A transmission path 5 is connected to input port IV, and a result of accessing to memory 3 in video memory unit 11 is applied through transmission path 5. Transmission paths 9 and 10 are connected to output ports OA and OB, respectively, and a result of processing by the system is output onto transmission paths 9 and 10. A transmission path 4 is connected to output port OV, and data for accessing video memory unit 11 is output onto transmission path 4. Memory interface 2 and video memory 3 are connected through a memory access control line 6. Note that a datapacket is transmitted through transmission paths 4 to 10.

In a data processing operation, a time-series of datapackets for signal input is applied to processor 1 through input port IA or IB, and each of the datapackets has a generation number allocated based on the order in which they are input. Processor 1, which prestores a data flow program for video processing, processes applied data based on the program. Processor 1 outputs a datapacket resulting from the processing through one of output ports OA, OB and OV. A datapacket sent out from processor 1 to video memory unit 11 through output port OV stores an access request (reference to/update of data stored in video memory 3).

Upon receiving such an access request, memory interface 2 accesses video memory 3 through memory access control line 6. Memory interface 2 applies a datapacket obtained as a result of the accessing to the input port IV of processor 1 through transmission path 5.

Processor 1 processes the datapacket applied through input port IV based on the program. Processor 1 outputs a datapacket obtained as a result of the processing at one of output ports OA, OB and OV.

Referring to FIG. 2, a datapacket applied to the video memory unit includes an instruction code (a), a generation number (b), data 1 (c) and data 2 (d) as well as a processor number (e) for uniquely specifying the data driven processor in the system which is determined to process the datapacket. These pieces of data are of 8 bits, 24 bits, 12 bits, 12 bits, and 10 bits in length. It should be noted that the field configuration and the bit length of each field are described simply by way of example.

Instruction code (a) is for specifying the content of a processing to video memory 3. Instruction code (a) specifies a read instruction instructing a process of reading data stored in the video memory or an update instruction instructing a process of updating data stored in video memory 3.

Generation number (b) is an identifier attached to a datapacket based on the order of input when the datapacket is input to data driven processor 1 through data transmission path 7 or 8. Generation number (b) is used for matching of datapackets in processor 1, and for addressing of video memory 3 in video memory unit 11.

Data 1 (c) and data 2 (d) are interpreted based on the content of instruction code (a). If instruction code (a) is an update instruction, data 1 (c) indicates data to be written into video memory 3, while data 2 (d) has no meaning. If instruction code (a) is a read instruction, data 1 (c) and data 2 (d) both have no meaning.

Referring to FIG. 3, a datapacket output from video memory unit 11 and a datapacket input/output to/from data driven processor 1 for video processing includes an instruction code (f), a generation number (g), data 1 (h), and a processor number (i). Their lengths are 8 bits, 24 bits, 12 bits, and 10 bits, respectively. Note that the field configuration and the bit length of each field are described simply by way of example.

If a datapacket as shown in FIG. 3 is output from video memory unit 11, instruction code (a), generation number (b) and processor number (e) shown in FIG. 2 are stored in the fields of instruction code (f), generation number (g), and processor number (i) shown in FIG. 3, respectively. Data obtained as a result of accessing video memory 3 based on instruction code (a) in FIG. 2 is stored in data 1 (h).

FIG. 4 illustrates a system configuration including four conventional data driven processors 1 for video processing. The four processors 1 in the system are allocated identification numbers PE#0, PE#1, PE#2, and PE#3, respectively for identifying one from another. Now, the structure and operation of the system shown in FIG. 4 will be described specifying a processor with an identification number.

In the system in FIG. 4, a network is established such that a datapacket can be provided to any arbitrary processor from any other processor. Assume that a datapacket will be provided from processor PE# to processor PE#1, for example. Processor PE# outputs a datapacket at output port OA and applies the output datapacket to the input port IA of processor PE#3. Processor PE#3 outputs the datapacket at output port OA. As a result, the datapacket is applied to the input port IA of processor PE#1.

FIG. 5 is a block diagram of the conventional data driven processor 1 suitable for video processing shown in FIGS. 1 and 4. Referring to FIG. 5, conventional processor 1 includes an input processing unit 17 having an input stage to which input port IA and IB are connected, a junction unit 12, a main body processing unit 13 for executing a processing based on a data flow program stored therein, a branching unit 14, an output processing unit 15 having an output stage to which output ports OA and OB are connected, and a PE# register 16 storing an identification number PE# unique to the processor 1 for identifying itself in the network of the system.

Input processing unit 17 receives a datapacket applied at input port IA or IB. Input processing unit 17 compares the processor number in the datapacket with the content of register 16. If they are in agreement, input processing unit 17 determines that the datapacket is destined thereto and outputs the datapacket to junction unit 12. Input processing unit 17 otherwise determines that the datapacket is destined to another processor and applies the datapacket to output processing unit 15.

Junction unit 12 merges datapackets applied from input processing unit 17 and datapackets applied from branching unit 14 for output to main body processing unit 13. Branching unit 14 will be described later.

Main body processing unit 13 processes the applied datapacket based on a prestored data flow program. During the processing, an access request to video memory 3 may occur. In such a case, main body processing unit 13 sends the packet under processing (see FIG. 2) through output port OV to video memory unit 11 and receives therefrom a packet obtained as a result of processing through input port IV (see FIG. 3).

Branching unit 14 receives a datapacket output from main body processing unit 13 and compares a processor number stored in the datapacket and the content of register 16 as input processing unit 17 does. Branching unit 14 applies the datapacket to junction unit 12 if they are in agreement, or else to output processing unit 15.

Output processing unit 15 receives datapackets applied from input processing unit 17 and branching unit 14. Output processing unit 15 selects one of output ports OA and OB based on a processor number stored in a datapacket and a preset branching condition. Output processing unit 15 outputs the datapacket at the selected output port.

While a processing based on a data flow program is in progress in the system as illustrated in FIG. 4, a processing result cannot be obtained as expected in some cases. In other words, the system may not sometimes operate as expected. In such a case the location of the fault responsible should be specified, the kind of fault should be specified, and countermeasure should be considered, in order to cope with the situation. This is however not easily done. Specifying the location of such a fault would be harder particularly if the number of processors included in the system is larger.

The above-described operation fault can be caused by an erroneous setting of PE# register in processor 1. If PE# register is erroneously set, a datapacket cannot be transferred correctly between processors.

Conventionally, for PE# register 16, hardware which provides processor 1 with prescribed terminal voltage or software including a special instruction for setting data in register 16 is used. If any of these setting methods is adopted, however, the conventional system does not have a function of verifying the content set in PE# register 16, and therefore the content of PE# register cannot be confirmed.

SUMMARY OF THE INVENTION

It is therefore an object of the invention to permit identification data preset for a unit to be verified in a data driven information processing system including one or more units.

Another object of the invention is to permit identification data preset for each unit to be verified in a data driven information processing system including a plurality of units.

Yet another object of the invention is to provide a method of readily verifying identification data preset for each unit in a data driven information processing system including a plurality of units.

A still further object of the invention is to provide a method of verifying identification data preset for each processor more easily and with a reduced workload, in a data driven information processing system including a plurality of units.

An additional object of the invention is to provide a method of verifying identification data preset for a series of desired units in a data driven information processing system including a plurality of units.

A method according to the invention verifies identification information allocated to a processing unit in a data driven information processing system having an input and an output for datapackets and including processing units for processing datapackets, and interconnection providing a plurality of paths between processors. The processing unit has a plurality of input ports, a plurality of output ports and a unit for dynamically selecting one of the output ports. The method includes the following steps: previously specifying a path for a datapacket via the processing units from the input to the output; providing the data driven information processing system at the input with a datapacket for identification storing information specifying the number of other processing units to be passed from the input to the processing unit to which the packet is destined in the specified path and an instruction of verifying predetermined identification data; a first transmission step for transmitting the datapacket for identification along the specified path to the processing unit of destination while updating the information indicating the number of processing units and applying the packet to the processing unit; producing a result datapacket which stores identification data in the processing unit for output onto the specified path; a second transmission step of outputting the result datapacket along the specified path to the output for output thereto; and verifying the identification data stored in the output result datapacket.

According to the method, when a datapacket for identification is applied to the system, the datapacket is transmitted along the specified path. During this time, information on the number of processing units for the datapacket for identification to pass until it reaches the processing unit to which it is destined is updated. Once the datapacket is transmitted to the intended processing unit, a result datapacket storing identification data preset in the processing unit is produced at the processing unit for output. The result datapacket is transmitted to the output of the system, and the identification data stored in the output datapacket is examined, in order to know the identification data preset in the intended processing unit. It can be verified whether or not the identification data is correctly set in the processing unit, and a test for the operation of the system is thus simplified.

The information processing system preferably includes a plurality of processing units each having identification data uniquely set to them. In this case, identification data for any arbitrary processing unit among them can be verified. More preferably, the specifying step includes a step of previously specifying a path such that a datapacket passes through all the plurality of processing units in the data driven information processing system. A setting in the system for transmitting a datapacket along the path can previously be checked. If a plurality of datapackets are input to the system with their originally set processor number information being sequentially changed, identification information for all the processing units within the system can be known.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 15A to 15E are representations each showing the content of the field of a datapacket storing an ID verification instruction code transmitted in the system shown in FIG. 14;

FIG. 21 is a table showing values for 2-bit switch signals SW1 and SW0 and corresponding values set for each BID terminal in the system in FIG. 20;

DETAILED DESCRIPTION OF THE PREFERRED EMBODIMENTS

Now, embodiments of the invention will be described in detail in conjunction with accompanying drawings.

Figure 6:
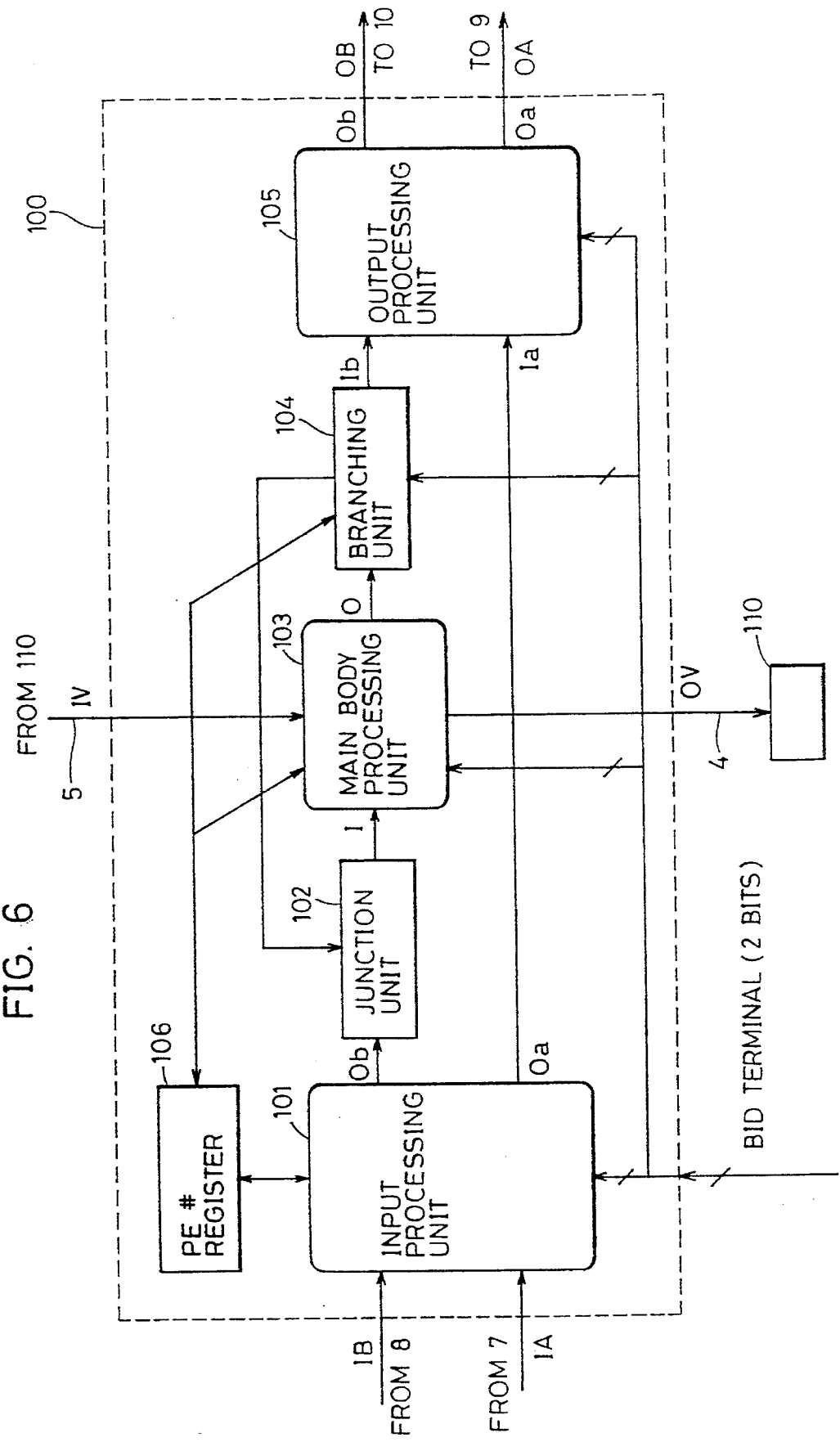
FIG. 6 is a block diagram showing a data driven processor for video processing according to one embodiment of the invention.

Referring to FIG. 6, a data driven processor for video processing 100 according to one embodiment of the invention has input ports IA, IB and IV, and output ports OA, OB and OV. Transmission paths 7, 8 and 5 are connected to input ports IA, IB and IV. Transmission paths 9, 10 and 4 are connected to output ports OA, OB and OV, respectively. Processor 100 is connected to a video memory unit 110 which will be described later through transmission paths 4 and 5.

Processor 100 includes an input processing unit 101 having an input stage to which input ports IA and IB are connected, a junction unit 102, a main body processing unit 103 for executing a processing based on a prestored data flow program, a branching unit 104, an output processing unit 105 having an output stage to which output ports OA and OB are connected, and a PE# register 106 storing an identification number PE# for uniquely identifying processor 100 in the network of the system.

A 2-bit external terminal called a BID terminal is connected to processor 100. A value set at BID terminal is applied to input processing unit 101, main body processing unit 103, branching unit 104, and output processing unit 105.

Input processing unit 101, main body processing unit 103, and branching unit 104 are connected to PE# register 106 and read the content therein. Units 101, 103, and 105 in processor 100 will be described later in detail.

In the embodiment, in order to verify the content of PE# register 106 in processor 100 in FIG. 6 or the system including processor 100, a special instruction called ID verification instruction is used. Now, the ID verification instruction will be described in detail.

Figure 7:
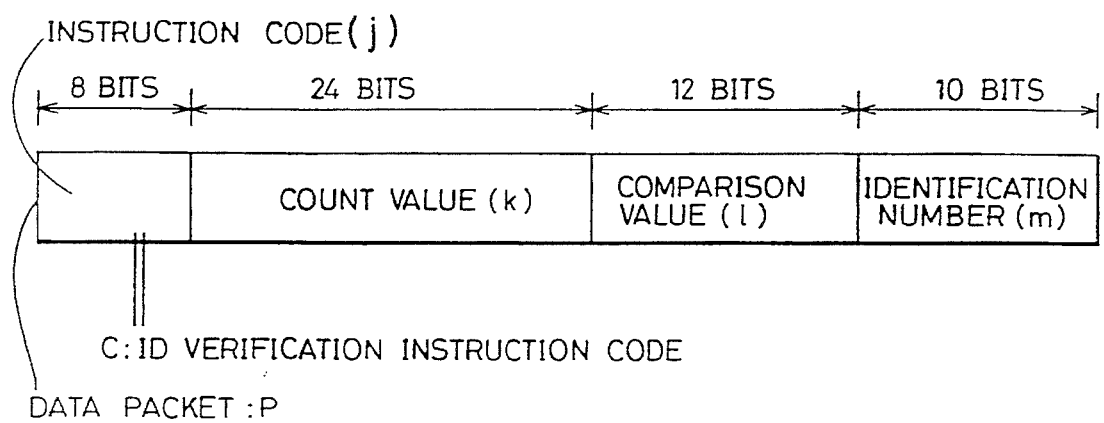
FIG. 7 is a diagram showing the field configuration of a datapacket related to an ID verification instruction according to one embodiment of the invention.

Referring to FIG. 7, a datapacket P related to an ID verification instruction according to one embodiment of the invention includes an instruction code (j), a count value (k), a reference value (l), and an identification number (m). They are 8 bits, 24 bits, 12 bits, and 10 bits in length, respectively. The configuration of the datapacket is however described simply by way of example, and a different field configuration may be employed.

Instruction code (j) includes an ID verification instruction code C. Count value (k) is incremented by 1 every time datapacket P passes processor 100, and indicates the number of processors 100 through which datapacket P has passed. Reference value (l) specifies a processor 100 whose register 106-s content is intended to be verified. Reference value (l)

indicates the number of processors existing along the path for datapacket P between the intended processor and the input of the system plus 1. The content of register 106 of processor 100 is stored in the field of identification number (m) if count value (k) and reference value (l) are in agreement or more specifically, identification number (m) matches the content of register 106 of the intended processor 100.

Figure 2:
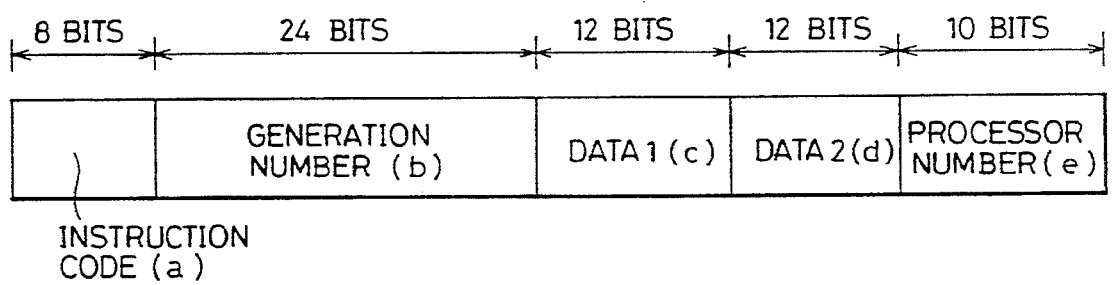
FIG. 2 is a diagram showing the field configuration of a datapacket applied to a video memory unit during a normal operation.
Figure 3:
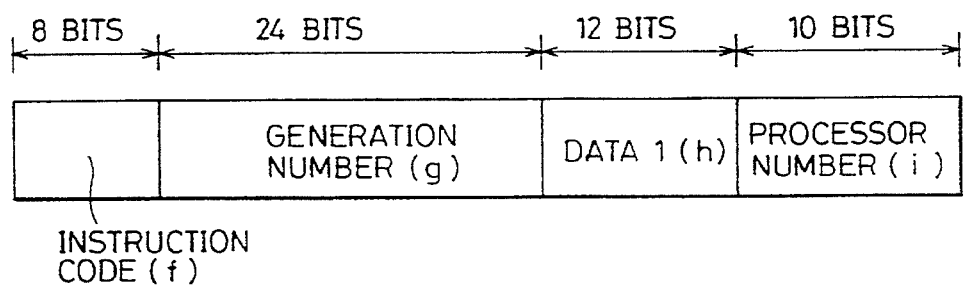
FIG. 3 is a diagram showing the field configuration of a datapacket output from a video memory unit or a datapacket input/output to/from a data driven processor for video processing during a normal operation.
Figure 4:
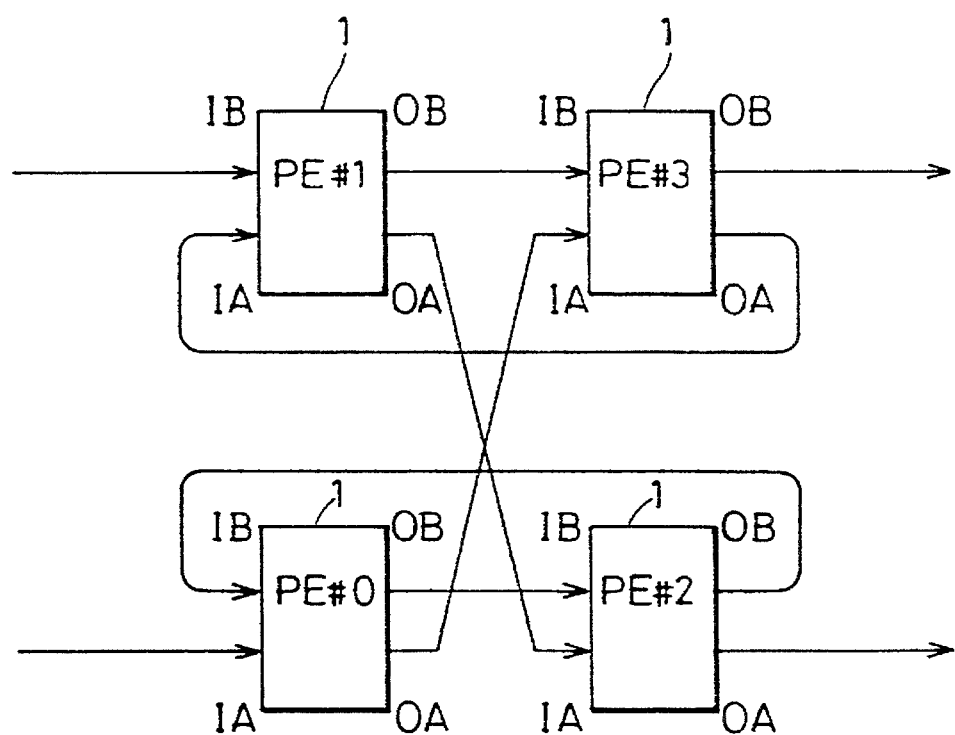
FIG. 4 is a diagram showing a system configuration using four data driven processors for video processing.
Figure 5:
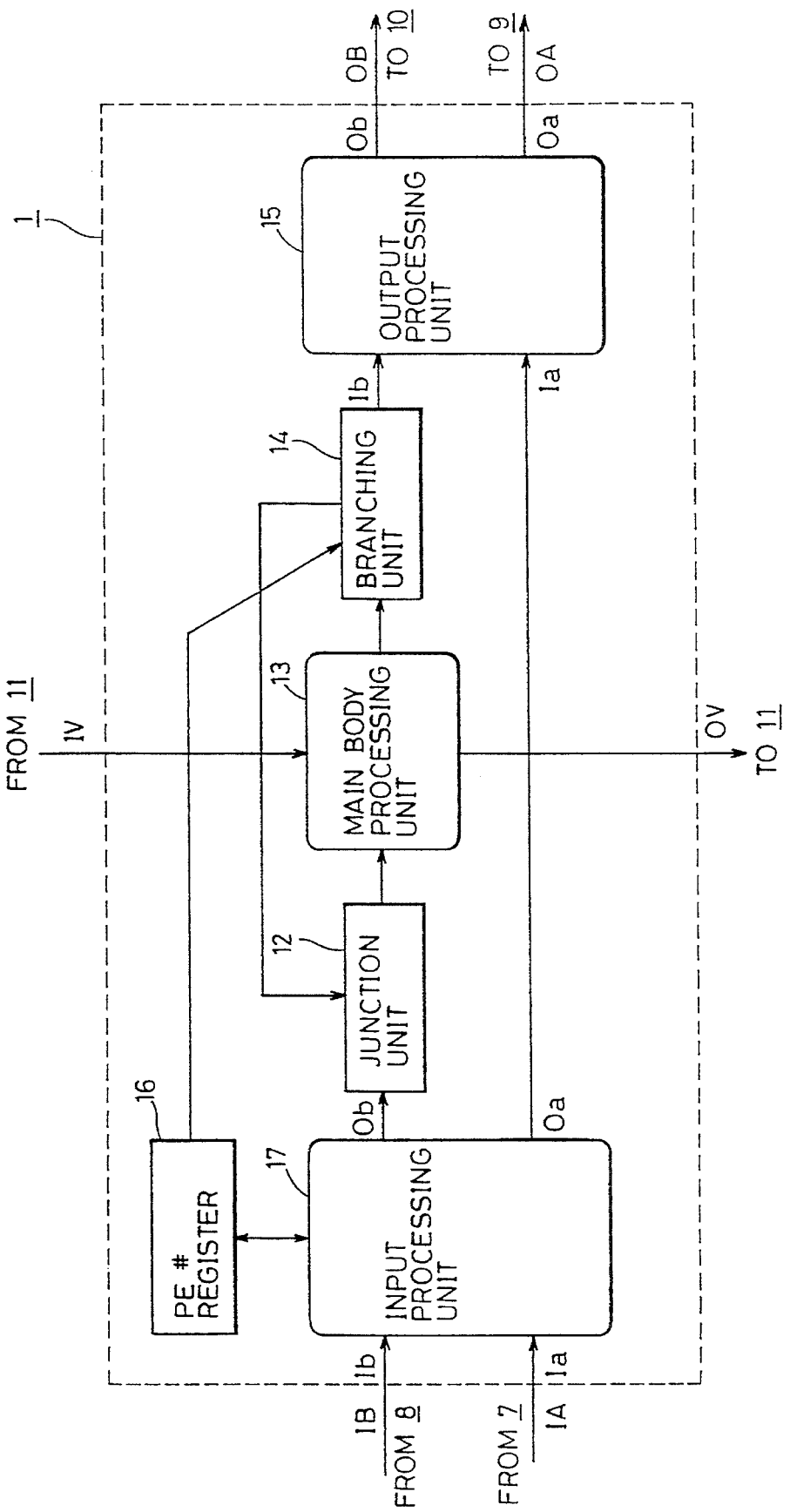
FIG. 5 is a block diagram showing the structure of a conventional data driven processor for video processing.

Note that when datapacket P related to an ID verification instruction shown in FIG. 7 is applied to processor 100, the path for the datapacket P in processor 100 will be different from the transmission paths for the datapacket in FIGS. 2 and 3 described in conjunction with FIG. 5. The path of datapacket P in processor 101 is determined based on a setting at BID terminal. This will be described later in detail.

Figure 8:
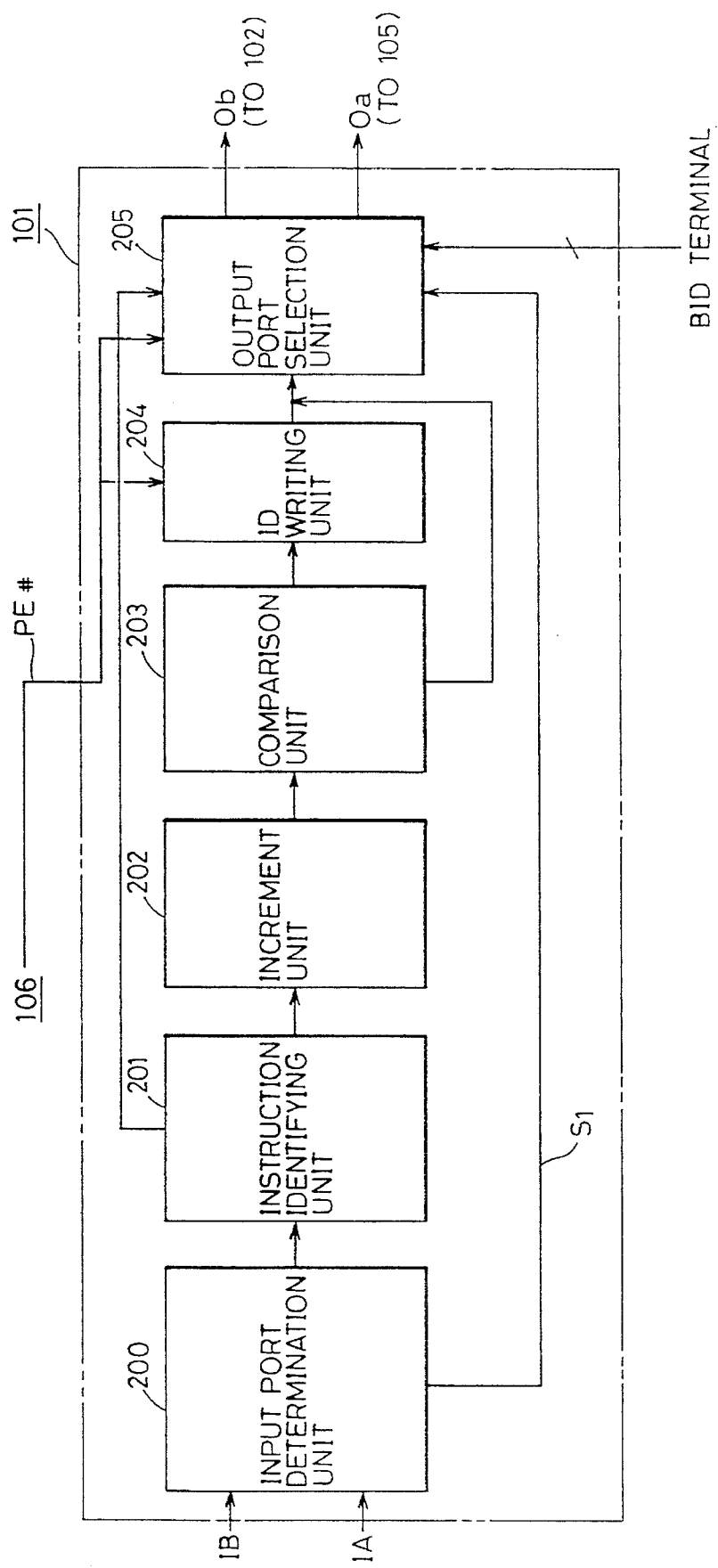
FIG. 8 is a block diagram showing the structure of the input processing unit shown in FIG. 6.

Referring to FIG. 8, input processing unit 101 in FIG. 6 includes an input port determination unit 200 (which has an input stage connected to input ports IA and IB, determines at which port the datapacket is applied and outputs an input port determination signal S1), an instruction identifying unit 201 (which identifies an instruction code in datapacket P), an increment unit 202 (which increments count value (k) in datapacket P by 1), a comparison unit 203 (which compares count value (k) and reference value (l) in datapacket P), an ID writing unit 204 (which sets identification number PE# in register 106 for identification number (m) in datapacket P), an output port selection unit 205 (which selects an output port OB to junction unit 102 or an output port OA to output processing unit 105 based on signal S1 and a value set at BID terminal, and outputs an applied datapacket at the selected output port).

Input port determination unit 200 applies the datapacket to instruction identifying unit 201. Input port determination unit 200 determines whether the datapacket is input at input port A or B and applies input port determination signal S1 to output port selection unit 205.

Instruction identifying unit 201 identifies the ID verification instruction code of the applied datapacket. Instruction identifying unit 201 applies the datapacket to increment unit 202 if the instruction code is ID verification instruction C, or else to output port selection unit 205.

Increment unit 202 increments the count value (k) of applied datapacket P by 1. Increment unit 202 applies datapacket P to comparison unit 203.

Comparison unit 203 compares the count value (k) of applied datapacket P and reference value (l). Comparison unit 203 applies datapacket P to ID writing unit 204 if they are in agreement, and otherwise applies datapacket P to output port selection unit 205.

ID writing unit 204 receives identification number PE# from register 106 and stores the number in the field of the identification number (m) of applied datapacket P. ID writing unit 204 applies the datapacket to output port selection unit 205.

Output port selection unit 205 receives datapackets P from instruction identifying unit 201 and ID writing unit 204 and selects an output port Ob or Oa based on a prescribed condition. Output port selection unit 205 outputs datapacket P at the selected output port. The condition for selecting an output port when the datapacket is from ID writing unit 204 is different from the condition when the datapacket is from instruction identifying unit 201.

If the datapacket is from ID writing unit 204, output port selection unit 205 selects output port Oa or Ob based on input port determination signal S1 and a setting at BID terminal. How such selection is made will be described later.

If the datapacket is applied from instruction identifying unit 201 and therefore includes an instruction other than the ID verification instruction (see FIG. 3), output selection unit 205 selects output port Oa or Ob based on processor number (i) in the datapacket and identification number PE# read out from register 106. More specifically, output port selection unit 205 compares them. If they are in agreement, output port selection unit 205 selects output port Ob (junction unit 102), and otherwise selects output port Oa (output processing unit 105). Output port selection unit 205 applies the datapacket to the selected output port.

Figure 9:
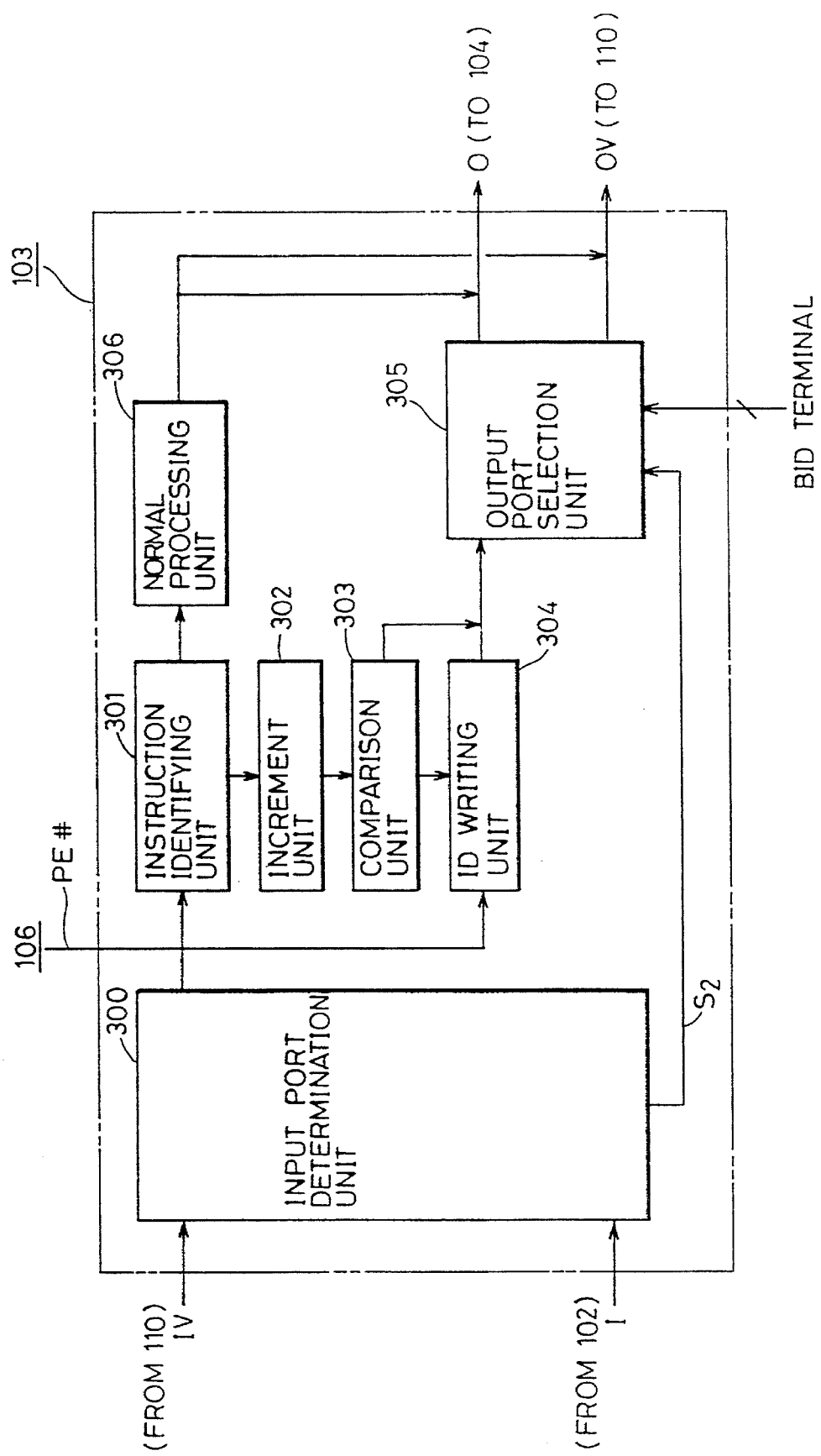
FIG. 9 is a block diagram showing the structure of the main body processing unit shown in FIG. 6.

Referring to FIG. 9, main body processing unit 103 in FIG. 6 includes an input port determination unit 300 (which is connected to input ports IV and I and determines at which input port the datapacket is applied and outputs input port determination signal S2), an instruction identifying unit 301 (which determines an ID verification instruction code in the datapacket), an increment unit 302 (which increments count value (k) in datapacket P by 1), a comparison unit 303 (which compares count value (k) and reference value (l) in datapacket P), an ID writing unit 304 (which stores identification number PE# in register 106 in the field of identification number (m) of datapacket P), an output port selection unit 305 (which is connected to output ports O and OV, selects one of output ports O and OV based on signal S2 and a setting at BID terminal and outputs a datapacket applied from ID writing unit 304 at the selected output port), a normal processing unit 306 (subjects a datapacket applied from instruction identifying unit 301 to a processing based on a prestored data flow program and outputs a resultant datapacket to output port O or OV).

Input port determination unit 300 receives a datapacket and applies the datapacket to instruction identifying unit 301. Input port determination unit 300 determines at which input port the datapacket is applied, and applies an input port determination signal S2 indicating the port to output port selection unit 305.

Instruction identifying unit 301 identifies an ID verification instruction code in the applied datapacket. Instruction identifying unit 301 applies the datapacket to increment unit 302 if the instruction code is ID verification instruction code C, and otherwise applies the datapacket to normal processing unit 306.

Increment unit 302 compares count value (k) in the applied datapacket and reference value (l).

Comparison unit 303 applies the datapacket P to ID writing unit 304 if they are in agreement, and otherwise applies datapacket P to output port selection unit 305.

ID writing unit 304 stores identification number PE# from register 106 in the field of the identification number (m) of applied datapacket P, and applies the datapacket to output port selection unit 305.

Output port selection unit 305 selects one of output ports O and OV based on input port determination signal S2 and a setting at BID terminal. Output port selection unit 305 outputs the applied datapacket at the selected output port.

Normal processing unit 306 processes the datapacket applied from instruction identifying unit 301 (see FIG. 3) based on a prestored data flow program. An instruction stored in the datapacket applied from instruction identifying unit 301 is a normal instruction other than ID verification instruction. Normal processing unit 306 outputs a datapacket storing a result of execution of the normal instruction at one of output ports O and OV.

Figure 10:
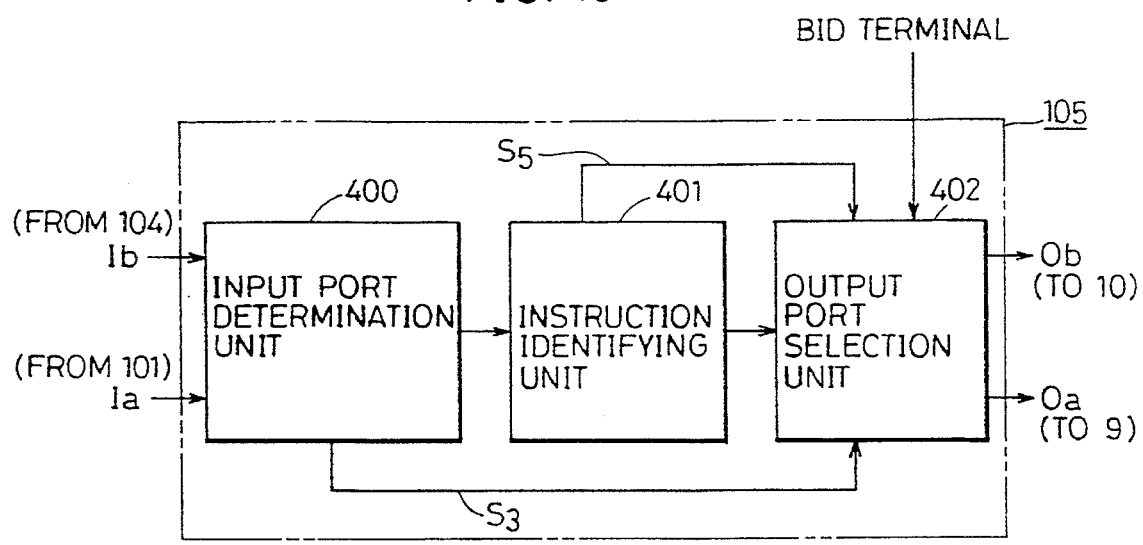
FIG. 10 is a block diagram showing the structure of the output processing unit shown in FIG. 6.

Referring to FIG. 10, output processing unit 105 in FIG. 6 includes an input port determination unit 400 (which is connected to input ports Ia and Ib, determines at which input port a datapacket is applied and outputs an input port determination signal S3), an instruction identifying unit 401 (which identifies an ID verification instruction code in a datapacket), an output port selection unit 402 (which selects one of output ports Oa and Ob based on determination signal S3 and a value set at BID terminal and outputs an input datapacket at the selected output port).

Input port determination unit 400 determines at which input port the datapacket is applied and applies signal S3 indicating the input port to output port selection unit 402. Input port determination unit 400 applies the datapacket to instruction identifying unit 401.

Instruction identifying unit 401 identifies ID verification instruction code C in the applied datapacket and applies an identification result signal S5 and the datapacket to output port selection unit 402.

Output port selection unit 402 selects output port Oa or Ob based on signals S3 and S5 and a setting at BID terminal. Output port selection unit 402 outputs the datapacket at the selected output. More specifically, output port selection unit 402 selects output port Oa or Ob in response to input port determination signal S3 if identification result signal S5 indicates "the instruction code is not ID verification instruction code C", and otherwise selects output port Oa or Ob based on input port determination signal S3 and a setting at BID terminal.

Figure 1:
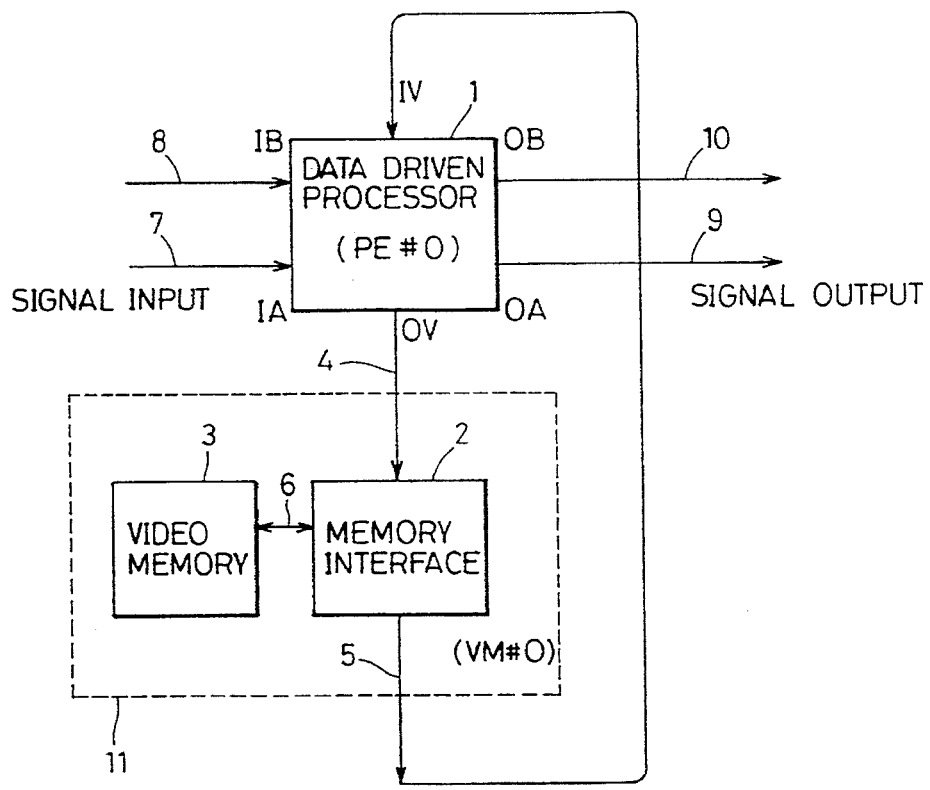
FIG. 1 is a block diagram showing a conventional data driven processor for video processing.
Figure 11:
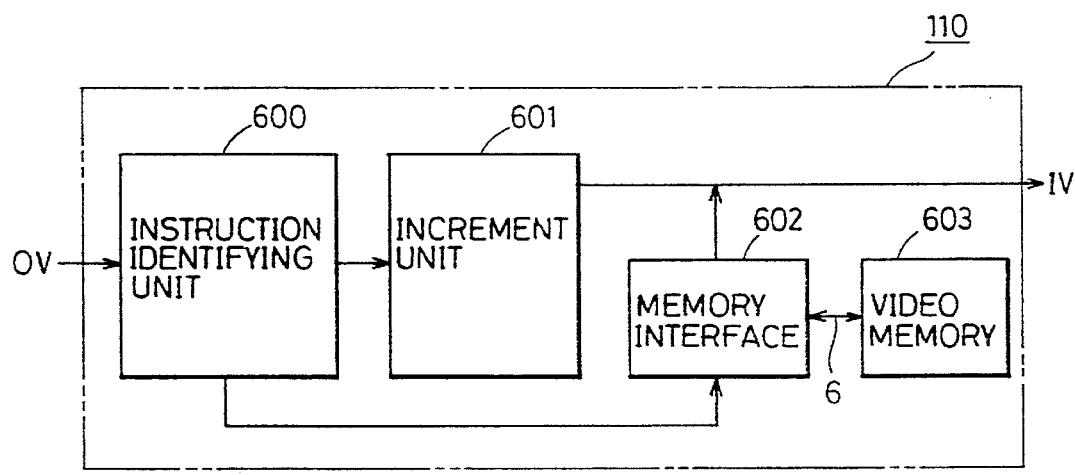
FIG. 11 is a block diagram showing the structure of the video memory unit in FIG. 6.

Referring to FIG. 11, video memory unit 110 in FIG. 6 includes an instruction identifying unit 600 (which receives a datapacket applied from the output port OV of a processor 100, identifies an ID verification instruction code in the datapacket, and outputs the datapacket), an increment unit 601 (which increments count value (k) of applied datapacket P by 1 for output), a memory interface 602 (which executes a processing based on an instruction included in a datapacket which it receives from instruction identifying unit 600 and outputs a result datapacket), a video memory 603 (mutually connected to memory interface 602 through an access control line 6). Memory interface 602 and video memory 603 correspond to conventional memory interface 2 and video memory 3 in FIG. 1, respectively. Their functions are same as those of memory interface 2 and video memory 3 in FIG. 1. Therefore, a detailed description of them is not repeated here.

Referring to FIG. 11, in operation, instruction identifying unit 600 identifies the ID verification instruction code C of an applied datapacket. Instruction identifying unit 600 applies the datapacket to increment unit 601 if the instruction code is ID verification instruction code C, and otherwise applies the datapacket to memory interface 602.

Increment unit 601 increments the count value (k) of applied datapacket P by 1, and applies datapacket P to the input port IV of processor 100.

Memory interface 602 accesses video memory 603 based on the instruction code and data of the datapacket applied from instruction identifying unit 600. Memory interface 602 applies a datapacket, to the input port IV of processor 100, storing a result of accessing.

FIGS. 12A to 12D schematically illustrate the relation between settings at BID terminal in processor 100 in FIG. 6 and corresponding transmission paths for datapacket P. FIGS. 13A to 13D show in detail values set at BID terminal and corresponding transmission paths for datapacket P in processor 100 in FIG. 6.

The paths in FIGS. 13A to 13D each has a path portion indicated in double-wavy line. At these path portions, the following processing is executed. More specifically, the count value (k) of datapacket P is incremented by 1. The incremented result and reference value (l) are compared. If they are in agreement, the content of PE# register 106 is written in the field of identity number (m) in datapacket P.

Note that the transmission paths for datapacket P depending upon settings at BID terminal as shown in FIGS. 12A to 12D and 13A to 13D, are, as described above implemented by output port selection units 205, 305, 402.

Figure 12A:
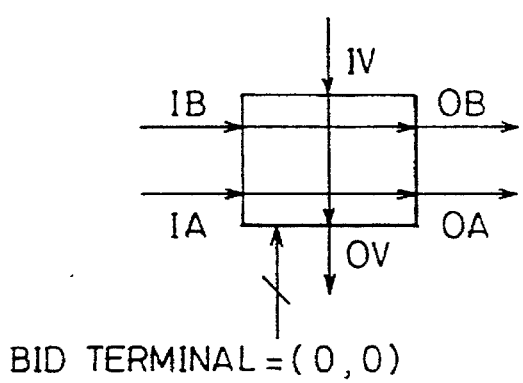
FIGS. 12A to 12D are diagrams schematically showing values each set for a BID terminal in the data driven processor in FIG. 6 and corresponding transmission paths for a datapacket storing an ID verification instruction code.
Figure 12B:
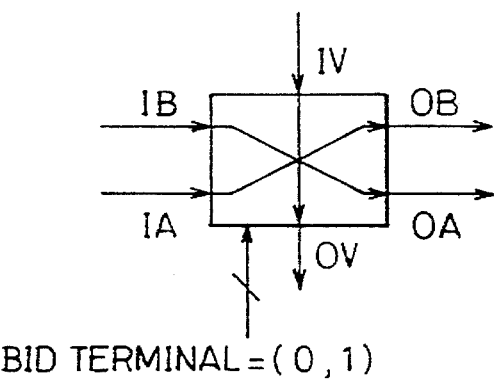
Figure 12C:
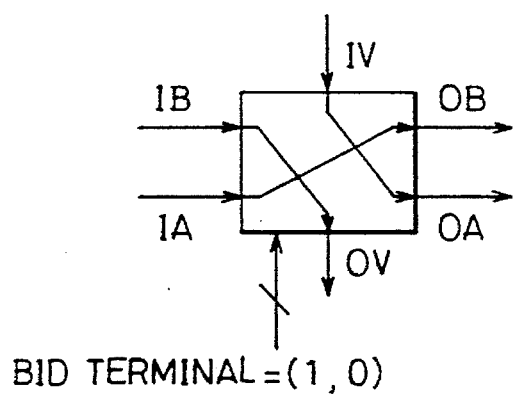
Figure 12D:
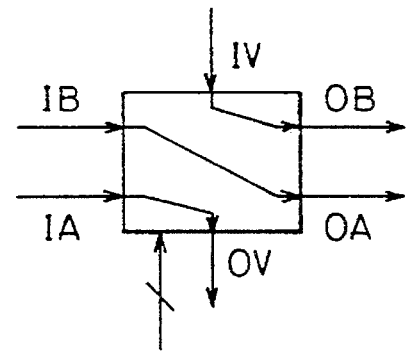
Figure 13A:
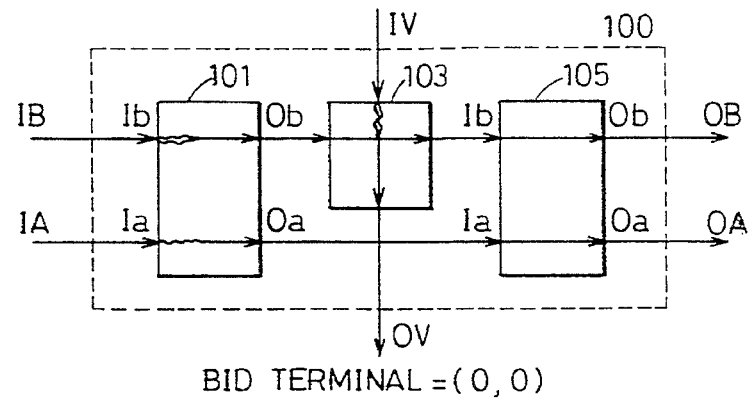
FIGS. 13A to 13D are diagrams showing in detail values each set for a BID terminal in the data driven processor in FIG. 6 and corresponding transmission paths for a datapacket storing an ID verification instruction code.
Figure 13B:
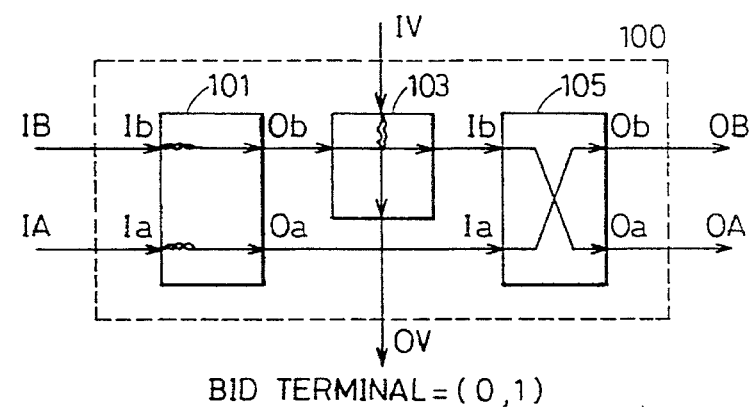
Figure 13C:
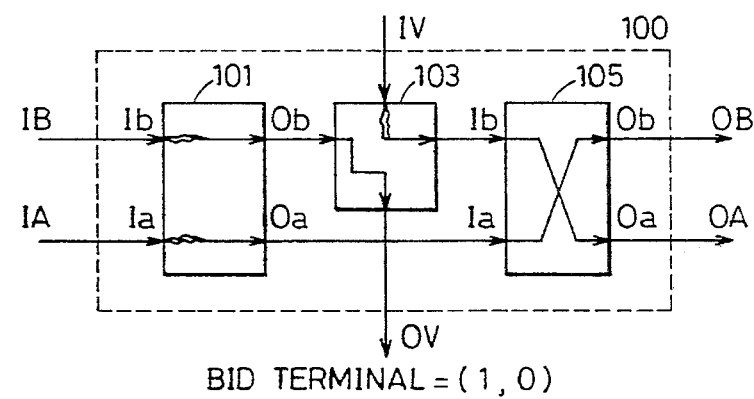
Figure 13D:
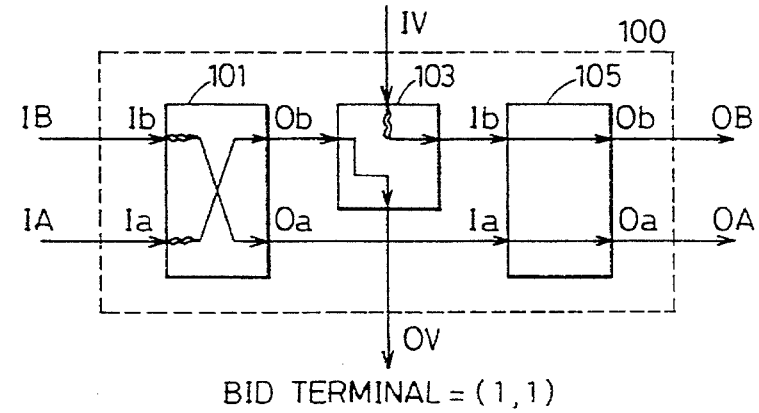

Assume, for example, that a setting at BID terminal is (0, 0) and that a datapacket P is applied to processor 100 at input port IA (FIGS. 12A and 13A.) Referring to FIG. 13A, input processing unit 101 increments count value (k) in datapacket P by 1. The incremented result and reference value (l) in datapacket P are compared. If they are in agreement, the content of PE# register 106 is written in the field of identification number (m) of datapacket P. Datapacket P is sent out to output processing unit 105 at the output port Oa of input processing unit 101. If the incremented result and the reference value (l) of datapacket P are not in agreement, identification number PE# will not be written. Datapacket P is sent to output processing unit 105 at output port Oa.

Output processing unit 105 receives datapacket P applied from input processing unit 101 at input port IA, and transmits the packet to output port Oa, and datapacket P is output from output port OA in processor 100.

Now, assume that a setting at BID terminal is (0, 0) and that a datapacket P is input from input port IB. Input processing unit 101 increments count value (k) in applied datapacket P by 1. The incremented result and reference value (l) in the datapacket are compared. If they are in agreement, the content of the PE# register is written in the field of identification number (m) in input datapacket P. Input processing unit 101 outputs datapacket P at output port Ob. If they are not in agreement, input processing unit 101 will output the datapacket at output port Ob without writing an identification number in datapacket P.

Datapacket P output from input processing unit 101 is applied to output processing unit 105 at its input port Ib without stopping at junction unit 102 (not shown in FIGS. 13A to 13D), main body processing unit 103 and branching unit 104 (not shown in FIGS. 13A to 13D). Output processing unit 105 directly outputs applied datapacket P at output port Ob. As a result, datapacket P is sent out to the output port OB of processor 100.

Now, assume that a setting at BID terminal is (0, 0) and that a datapacket P is input to processor 100 from input port IV. Referring to FIG. 13A, main body processing unit 103 increments count value (k) in datapacket P applied from input port IV by 1. The incremented result and reference value (l) in the datapacket P are compared. If they are in agreement, main body processing unit 103 writes the content of PE# register 106 in the field of identification number (m) of datapacket P, and outputs that datapacket P at output port OV. If they are not in agreement, main body processing unit 103 outputs datapacket P at output port OV without writing an identification number in datapacket P.

The above description is about the case in which BID terminal is set to (0, 0). Moving paths for a datapacket in processor 100 when BID terminal is set otherwise would be readily understood by the person skilled in the art from the above-description about the functions of units 101, 103, and 105, and FIGS. 12 and 13.

Figure 14:
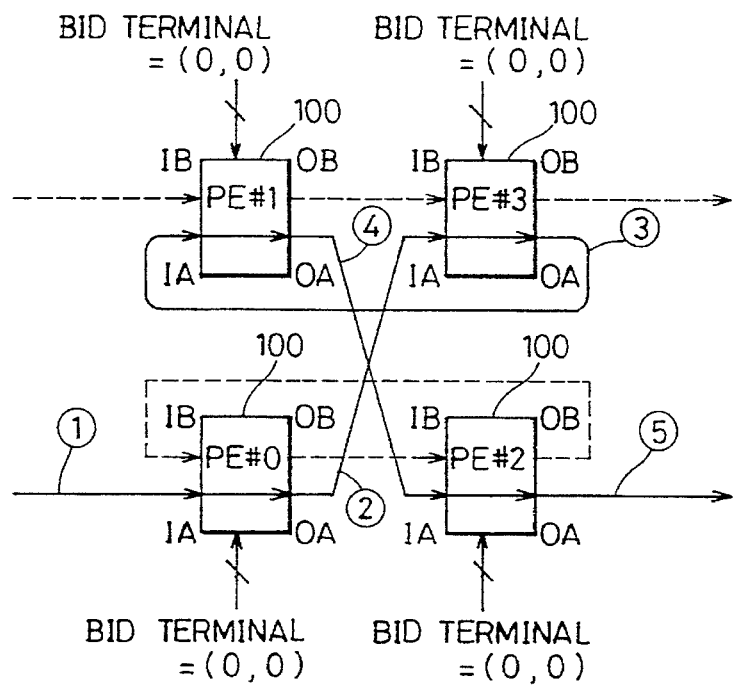
FIG. 14 is a diagram showing a transmission path for a datapacket storing an ID verification instruction code when a BID terminal is set to value (0,0) in a system having four data driven processors for video processing connected in a network according to one embodiment of the invention.

FIG. 14 shows a system having four data driven processors 100 for video processing connected in a network according to one embodiment of the invention. FIG. 14 also shows a transmission path for a datapacket P including an ID verification instruction code when a BID terminal is set to value (0, 0). Consider that BID terminal is set to (0, 0) in each of the four processors. It is assumed that identification numbers PE#0, PE#1, PE#2, and PE#3 are previously allocated to the processors, respectively, in the system in FIG. 14. Now, the movement of the datapacket P within the system in FIG. 14 and transition of the content will be described. Each processor will be specified using its identification number in the following description. Note that FIGS. 15A to 15E illustrate transition of the content of the field of datapacket P transmitted within the system.

Assume that processor PE# is provided with a datapacket P at its input port IA. Input datapacket P is illustrated in FIG. 15A. The datapacket stores an ID verification instruction code C in the field of instruction code (a), zeros as initial values in the fields of count value (k) and identification number (m), and "3" in the field of reference value (l). The value (3) in reference value (l) indicates that identification number PE# allocated to the third processor the datapacket reaches is desired to be verified.

The count value (k) of the datapacket input to processor PE# (FIG. 15A) is incremented by 1. This results in a datapacket in FIG. 15B (which is output from processor PE# at output port OA).

Datapacket (FIG. 15B) is applied to processor PE#3 at its input port IA. Count value (k) is incremented by 1 in processor PE#3. This results in a datapacket in FIG. 15C (which is output from processor PE#3 at output port OA).

The datapacket is provided to processor PE#1 at input port IA. Count value (k) is incremented by 1 in processor PE#1. At the time, the incremented count value (k) and reference value (l) come into agreement. Accordingly, identification number PE# (PE#1) preset for processor PE#1 is written in the field of identification number (m) of the datapacket. This results in a datapacket shown in FIG. 15D (which is output from processor PE#1 at output port OA).

The datapacket (FIG. 15D) is then input to processor PE#2 at input port IA. Count value (k) is incremented by 1 in processor PE#2. This results in a datapacket shown in FIG. 15E (which is output from processor PE#2 at output port OA).

Value "PE#1" is stored in the field of identification number (m) of a datapacket in FIG. 15E. This indicates identification number PE# which is allocated to the third processor 100 that datapacket P (FIG. 15A) applied to the system in FIG. 14 has reached. Assuming that identification number PE# for processor PE#1 is not correctly set, the identification number (m) of the datapacket in FIG. 15E will not be value "PE#1". Accordingly, it is known that the setting of the register 106 of processor PE#1 is not correct. Therefore, the processor number of processor PE#1 can be reset to an appropriate value (PE#1).

In the foregoing, identification number PE# allocated to processor PE#1 is verified. However, the present invention is not only effective in the above-described example. According to the invention, setting an appropriate value in the field of the reference value (l) of datapacket P applied to processor PE# at input port IA permits verification of the identification number PE# of any arbitrary processor in the system. Reference value (l) selects a value indicating the number of processors the datapacket has passed until it reaches the intended processor plus 1. The value can readily be known by studying the moving path for datapacket P based on the interconnection between processors and a setting for a BID terminal for each processor. If the interconnection between the processors and the setting for BID terminal in each processor are fixed, reference values (l) for all the processors can previously be considered.

In the system shown in FIG. 14, the BID terminals of four processors are all set to value (0, 0). This is however simply by way of illustration, and any value can be set for BID terminal. In order to efficiently verify identification number PE#, the values of BID terminals are preferably set so that a path written with a single stroke of line through all the processors in the system is formed. Such a setting for BID terminal permits each processor and a reference value for verifying its identification number to be set substantially in a one-to-one correspondence. An appropriate reference value can readily be known, thus improving the efficiency of tests.

In the above-described embodiments, the fields of reference and count value are provided in a datapacket. The count value is incremented every time the packet passes through an apparatus such as a processor, and it is determined that the packet reaches the processor to which it is destined if the count value and the reference value are in agreement. The invention is however not limited thereto, and only the field of a count value may be provided in a datapacket, for example. In such a case, the reference value in the above-described embodiments is stored in the field of count value as an initial value. The count value is decremented by 1 every time the packet passes through an apparatus such as a processor. Then, when the count value becomes zero, it is determined that the packet has reached the processor to which it is destined.

Figure 16:
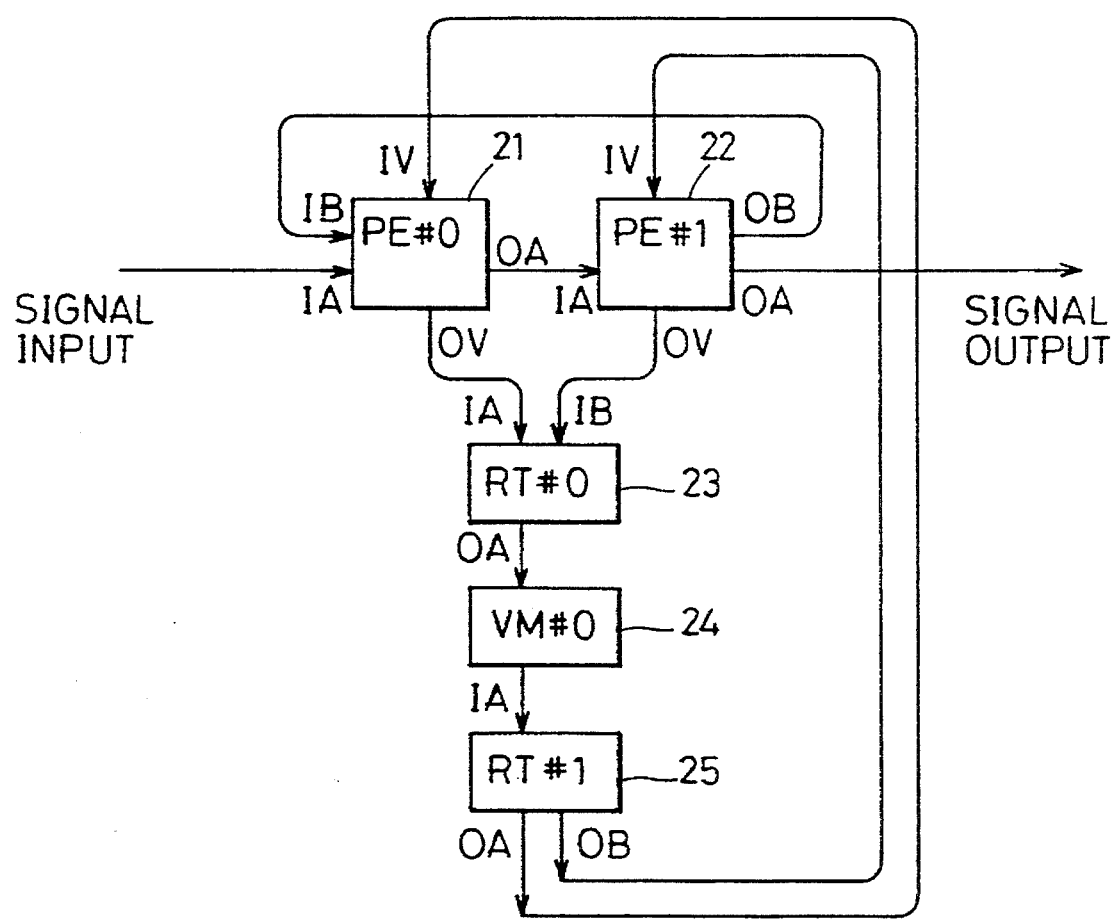
FIG. 16 is a diagram showing a system configuration when one video memory unit is shared between two data driven processors for video processing using two routers.

Hereinafter, a system including two data driven processors for video processing as described above and a single video memory unit shared between these data driven processors will be described. FIG. 16 shows the configuration of the system.

Referring to FIG. 16, the system includes two data driven processors 21 and 22 identical to data driven processor 100 (FIG. 6) as described above, routers 23 and 25, and a video memory unit 24 provided between routers 23 and 25. Note that in FIG. 16 input ports or output ports not in use are not shown.

Each of data driven processors 21 and 22 has input ports IA, IB, and IV, and output ports OA, OB, and OV. Routers 23 and 25 have structures identical to each other. Each of the routers has input ports IA and IB, and output ports OA and OB. In FIG. 16, note that the output port OB of processor 21, the input port IB of processor 22, the output port OB of router 23, and the output port IB of router 25 are not shown.

The output port OA of processor 21 is connected to the input port IA of processor 22, output port OV is connected to the input port IA of router 23, input port IB is connected to the output port OB of processor 22, and input port IV is connected to the output port OA of router 25. The input port IA of processor 21 is connected to the system input which, is not shown. The output port OV of processor 22 is connected to the input port IB of router 23, and input port IV is connected to the output port OV of router 25. The output port IA of processor 22 is connected to the system output which is not shown. The output port OA of router 23 is connected to the input of an video memory 24, and the input port IA of router 25 is connected to the output of video memory 24.

Figure 17:
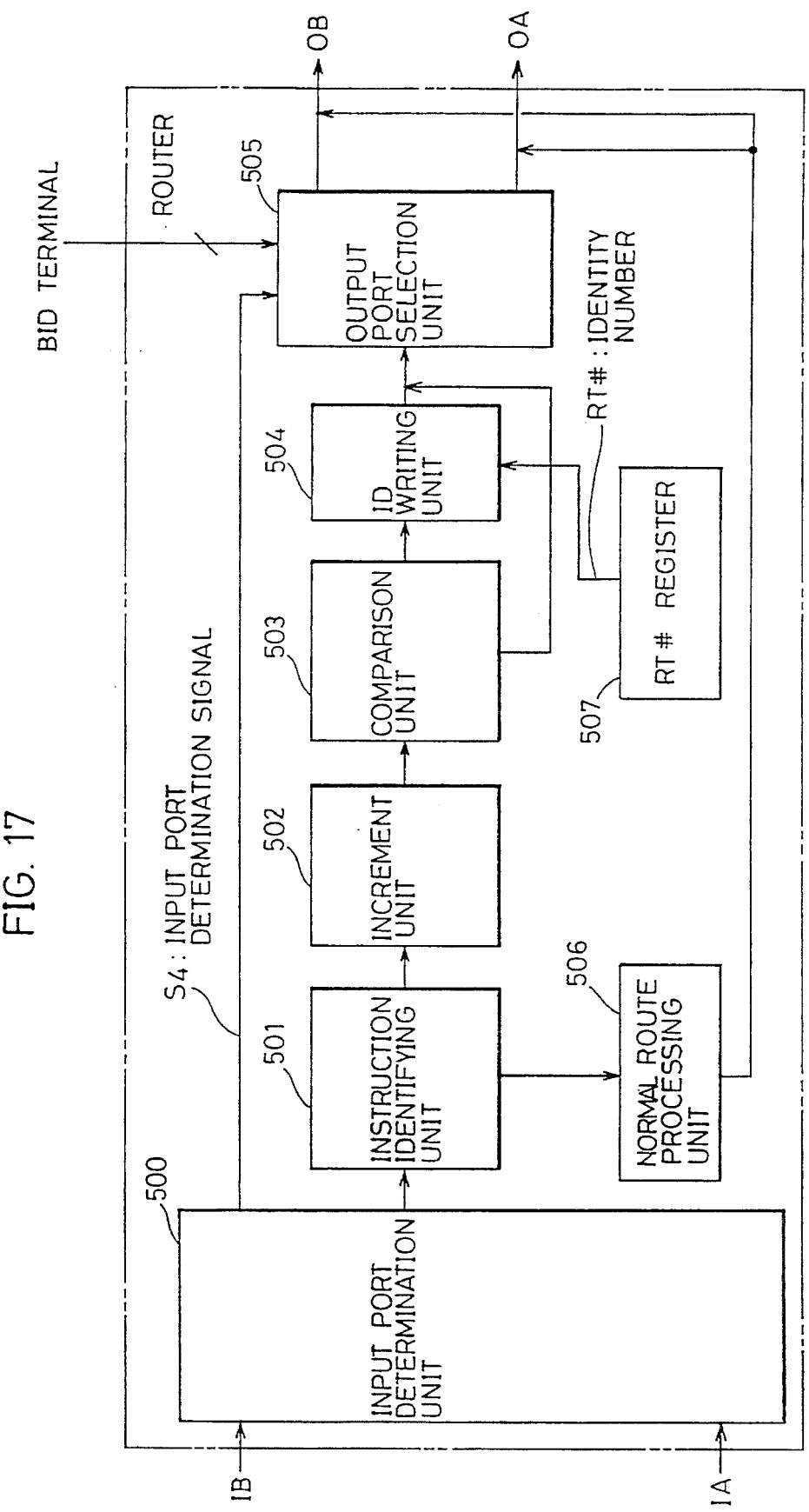
FIG. 17 is a block diagram showing a router according to one embodiment of the invention.
Figure 18A:
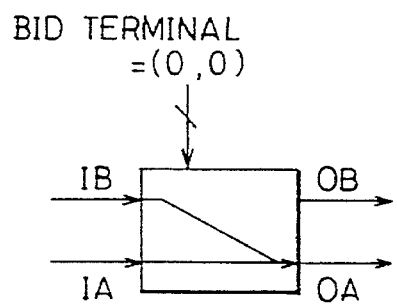
FIGS. 18A to 18D are diagrams showing values each set for a BID terminal in a router and corresponding transmission paths for a datapacket storing an ID verification instruction code.
Figure 18B:
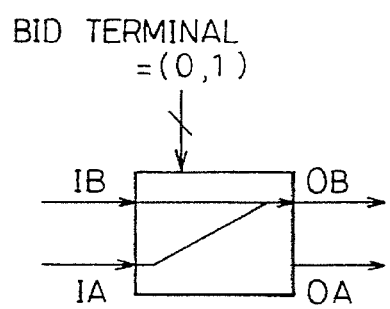
Figure 18C:
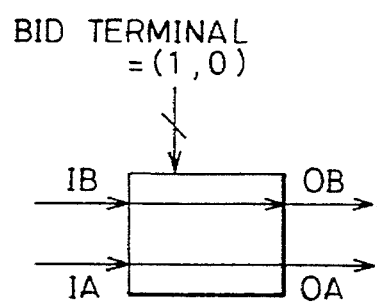
Figure 18D:
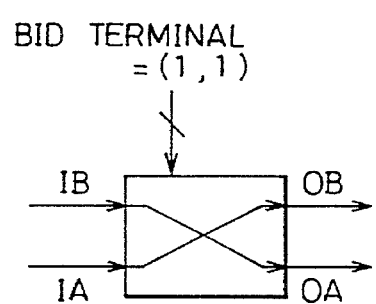

Referring to FIG. 17, router 23 includes an input port determination unit 500 (which receives a datapacket applied at input ports IA and IB, determines at which input port the datapacket is applied and outputs an input port determination signal S4), an instruction identifying unit 501 (which identifies an ID verification instruction code in a datapacket), an increment unit 502 (which increments count value (k) in datapacket P by 1), a comparison unit 503 (which compares count value (k) and reference value (l) in datapacket P), an ID writing unit 504, an output port selection unit 505, a normal route processing unit 506, and an RT# register 507. Router 23 (and 25) is further externally connected to a BID terminal.

ID writing unit 504 sets identification number (m) in datapacket P to identification number RT# in register 507. Identification number RT# uniquely identifies the router. Normal route processing unit 506 selects one of output ports OA and OB based on the generation number or processor number of an applied datapacket, and outputs the datapacket at the selected output port. Output port selection unit 505 selects one of output ports OA and OB based on determination signal S4 and a setting at BID terminal, and outputs an applied datapacket at the selected output port.

In operation, input port determination unit 500 applies a datapacket applied at input port IA or IB to instruction identifying unit 501. At the time, input port determination unit 500 determines at which input port the datapacket is applied and applies input port determination signal S4 to output port selection unit 505.

Instruction identifying unit 501 identifies an ID verification instruction code C in an applied datapacket. If ID verification instruction code C is present in the datapacket, instruction identifying unit 501 applies the datapacket to increment unit 502, and otherwise applies the datapacket to normal route processing unit 506. In the former case, the datapacket is as shown in FIG. 15A.

Increment unit 502 increments the count value (k) of applied datapacket P by 1 for application to comparison unit 503.

Comparison unit 503 compares the count value (k) and reference value (l) of the datapacket. Comparison unit 503 applies datapacket P to ID writing unit 504 if they are in agreement, and otherwise applies datapacket P to output port selection unit 505.

ID writing unit 504 sets the identification number (m) of applied datapacket P to identification number RT# read out from register 507, and outputs the datapacket to output port selection unit 505.

Output port selection unit 505 selects one of output ports OA and OB based on determination signal S4 and a setting at BID terminal. Output port selection unit 505 outputs the applied datapacket at the selected output port.

FIGS. 18A to 18D show values set for the BID terminal of a router, and corresponding transmission paths for a datapacket P in the router. These transmission paths can readily be confirmed from the foregoing description about the structure of the router. As can be seen from FIGS. 18A to 18D, the transmission paths for datapacket P are determined uniquely based on input port determination signal S4 applied to the output port selection unit 505 (see FIG. 17) of the router and the values set to BID terminal.

Figure 19:
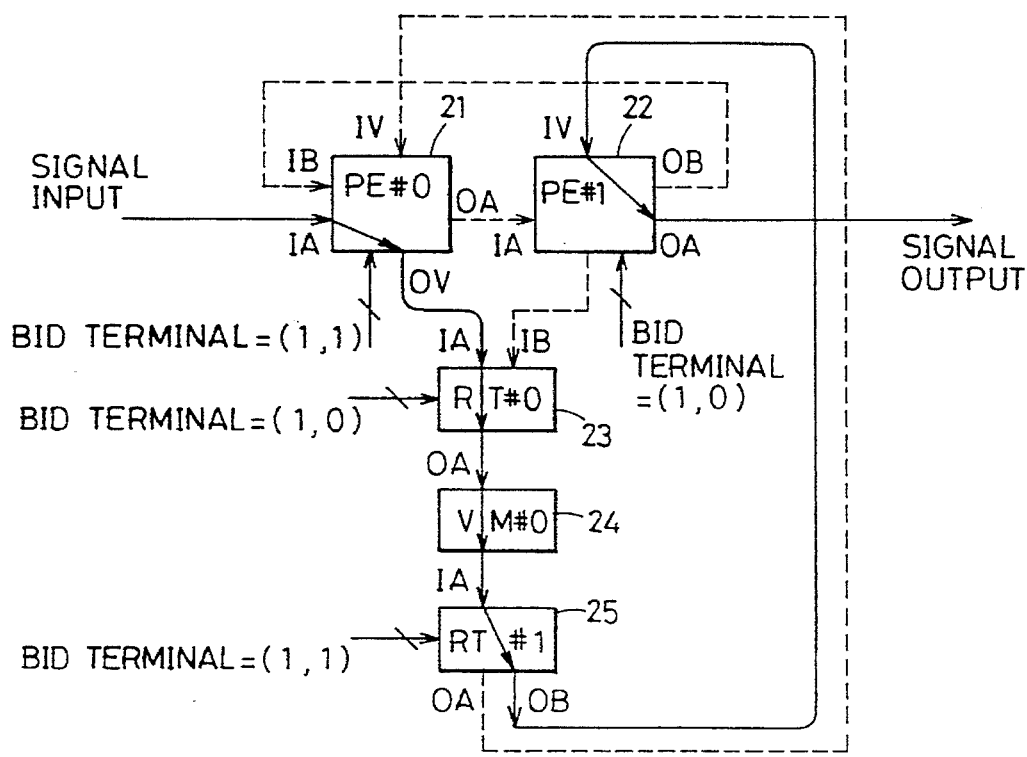
FIG. 19 is a diagram showing an example of content set to a BID terminal in the system shown in FIG. 16 and a transmission path for a datapacket storing a corresponding ID verification instruction code.

FIG. 19 illustrates examples of settings for BID terminals between processors 21 and 22, and routers 23 and 25 in the system in FIG. 16, and corresponding transmission paths for a datapacket P. In the system set as illustrated in FIG. 19, datapacket P passes through processor 21, router 23, video memory unit 24, router 25, and processor 22 in this order. More specifically, the transmission path written with a stroke of line passing through all the processors, all the routers and all the video memory units included in the system is implemented by settings shown in FIG. 19 for the BID terminals.

Figure 20:
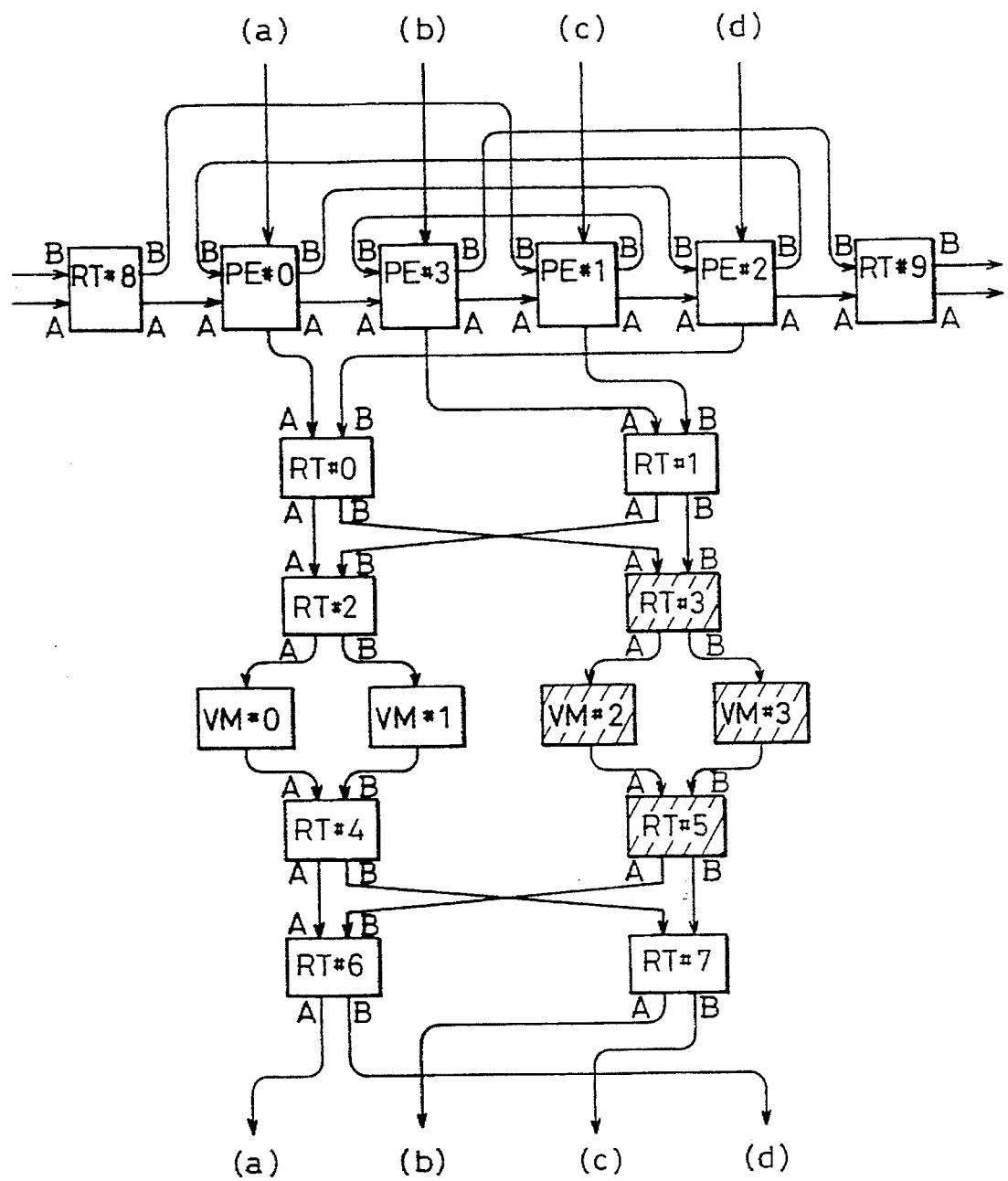
FIG. 20 is a diagram showing a system configuration when four video memory units are shared between four data driven processors for video processing using eight routers.

FIG. 20 shows a system called "4VM system", in which four data driven processors for video processing share four video memory units with eight routers. In the system in FIG. 20, the four processors are allocated identification numbers PE#0, PE#1, PE#2 and PE#3, respectively. The eight routers are allocated identification numbers RT#0, RT#1, ..., RT#7, respectively. The four video memory units are allocated identification numbers VM#0, VM#1, VM#2, and VM#3, respectively. Hereinafter, the processors are specified with their identification numbers PE#, the routers with their identification number RT#, and the video memory units with their identification numbers VM#.

The system in FIG. 20 further includes routers RT#8 and RT#9 provided to the input stage and output stage of the system. Routers RT#8 and RT#9 connect the system shown in FIG. 20 to another system having a similar configuration.

Referring to FIG. 20, the input ports A (IA) and B (IB) of router RT#0 are connected to the output ports OV of PE# and PE#2, for example. The input ports A (IA) and B (IB) of processors PE# are connected to the output port A (OA) of router RT#8 and the output port B (OB) of processor PE#2, respectively. The input port of video memory unit VM# is, for example, connected to the output port A of router RT#2, while the output port is connected to the input port A (IA) of router RT#4. Connections for other processors, routers, and video memory units are the same as those for processor PE#0, router RT#0, and video memory unit VM# as described above and can be readily seen from the figures, and therefore a detailed description thereof is not provide here.

In the system in FIG. 20, the system exclusive of routers RT#3 and RT#5, and video memory units VM#2 and VM#3 (which are shadowed) is called "2VM" system. The system exclusive of routers RT# to RT#7 and all the video memory units is called "0VM" system. In the 2VM system, only two video memories are used. In the 0VM system, no video memory is used. The 2VM system and the 0VM system will be described later, and now a method of verifying the identification number of each unit in a 4VM system will be described.

In the system in FIG. 20, when the setting for an identification number is verified using a datapacket P, BID terminals in processors and routers, 14 units in total must be preset. It is therefore troublesome to individually set a BID terminal for each processor and each router such that datapacket P is transmitted within the system by a transmission path written with a stroke of line.

This problem can be solved as follows. In the system in FIG. 20, the physical connection between processors, routers and video memory units are fixed. In the system, settings for BID terminals for forming a certain transmission path can be previously known. Settings for BID terminals in a normal operation are predetermined. Thus, a certain switch specifying the operation modes of the system are provided, and BID terminals are all set in response to the output of the switch. The operation modes in the system in FIG. 20 include four modes, i.e.., normal, 4VM, 2VM, and 0VM. 2-bit width is therefore enough for the output signal of the switch.

FIG. 21 is a table showing values for 2-bit switch signals SW1 and SW0 output by the above-described switch, and corresponding values set at BID terminals. Referring to FIG. 21, values for SW1 and SW0 are 1, 1, respectively in the normal execution mode. For 0VM, 2VM, and 4VM systems, SW1 and SW0 pairs (SW1, SW0) are (0, 0), (0, 1), and (1, 0), respectively. At the head of each column in FIG. 21 particular values for SW1 and SW0 are indicated, below which values set for the BID terminal of each processor or router are shown. A logic circuit deriving values indicated in each column in FIG. 21 from SW1 and SW0 may be provided for every processor or router.

The system shown in FIG. 20 is the 0VM system (in other words, routers RT#0 to RT#7 and video memory units VM# to #3 are not provided), and verifies the identification number of each processor by transmitting a datapacket P within the system. As illustrated in the first subcolumn of the second column in FIG. 21, switch signals (SW1, SW0) are set to (0, 0). A logical operation is conducted by the above-described logic circuits for processors PE# to PE#3 based on signals SW0 and SW1, and the result of operation (0, 0) is each set to the BID terminals of processors PE# to PE#3. At the time, a logical operation is conducted by the above-described logic circuits for routers RT#8 and RT#9, and the result of operation (1, 0) is set to the BID terminals of routers RT#8 and RT#9. Thus, if a logic circuit operating with the table shown in FIG. 21 as a truth table is designed, BID terminals for a number of processors and a number of routers can be set to prescribed values in response to 2-bit switch signals SW1 and SW0 at a time.

Figure 22:
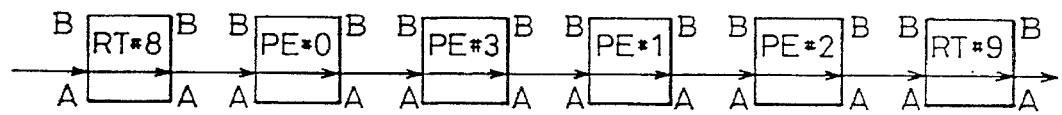
FIG. 22 is a diagram showing a transmission path for a datapacket storing an ID verification instruction code when the system in FIG. 20 is a 0VM system.

FIG. 22 shows a transmission path for a datapacket P when 2-bit switch signals (SW1, SW0) are set to (0, 0). One can readily confirm that the transmission path is established as shown. As shown in FIG. 22, simply setting switch signals (SW1, SW0) to (0, 0) allows a datapacket P to be transmitted through a path written with a stroke of line passing through all the processors within the system.

Figure 23:
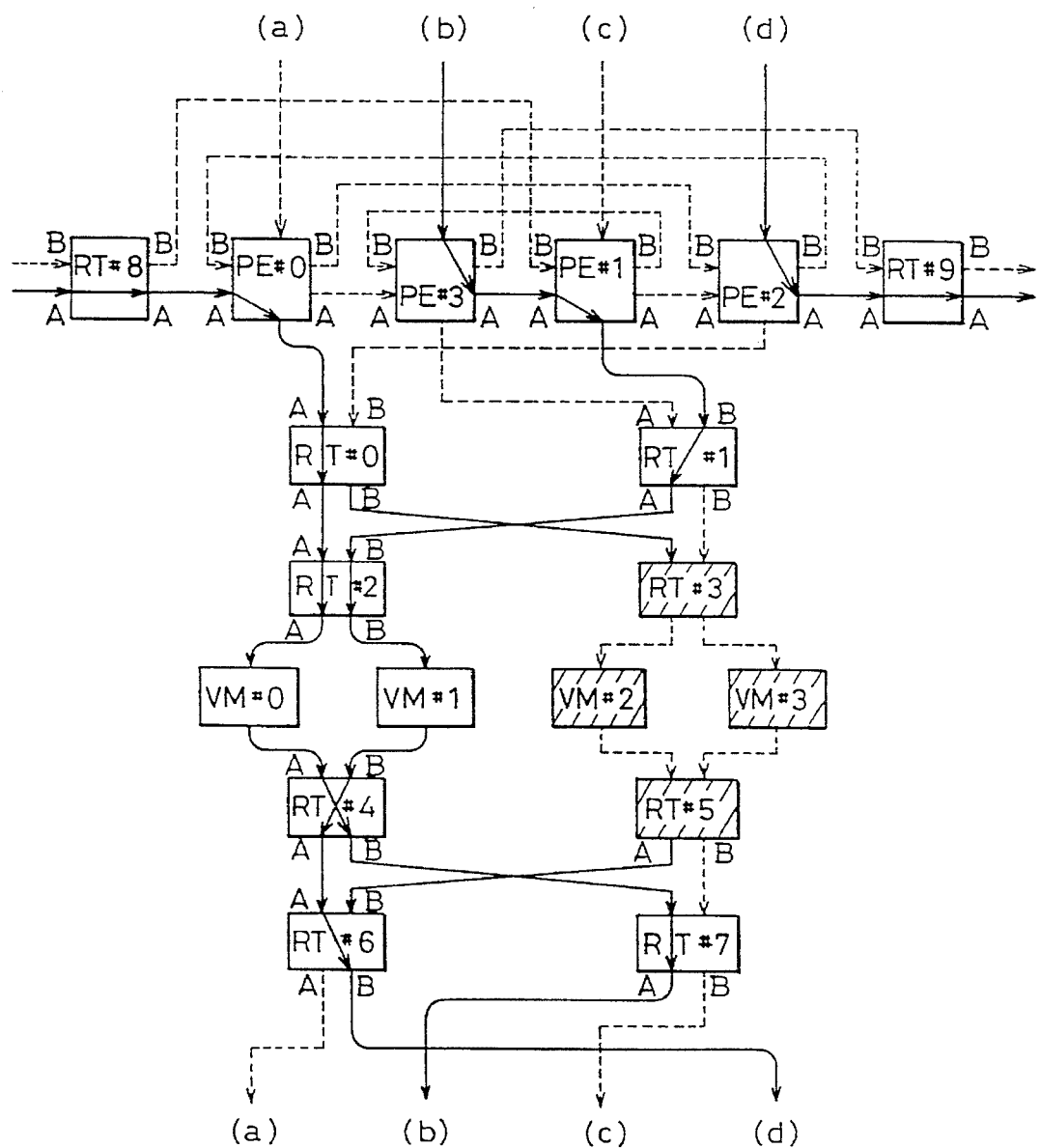
FIG. 23 is a diagram showing a transmission path for a datapacket storing an ID verification instruction code when the system in FIG. 20 is a 2VM system.

FIG. 23 shows a transmission path for a datapacket when the system in FIG. 20 is a 2VM system and 2-bit switch signals (SW1, SW0) are set to (0, 1). One can readily confirm that the transmission path can be implemented as shown. As shown in FIG. 23, simply setting switch signals (SW1, SW0) to (0, 1) allows datapacket P to be transmitted through a path written with a string of line passing through all the processors, all the routers and all the video memory units within the 2VM system.

Figure 24:
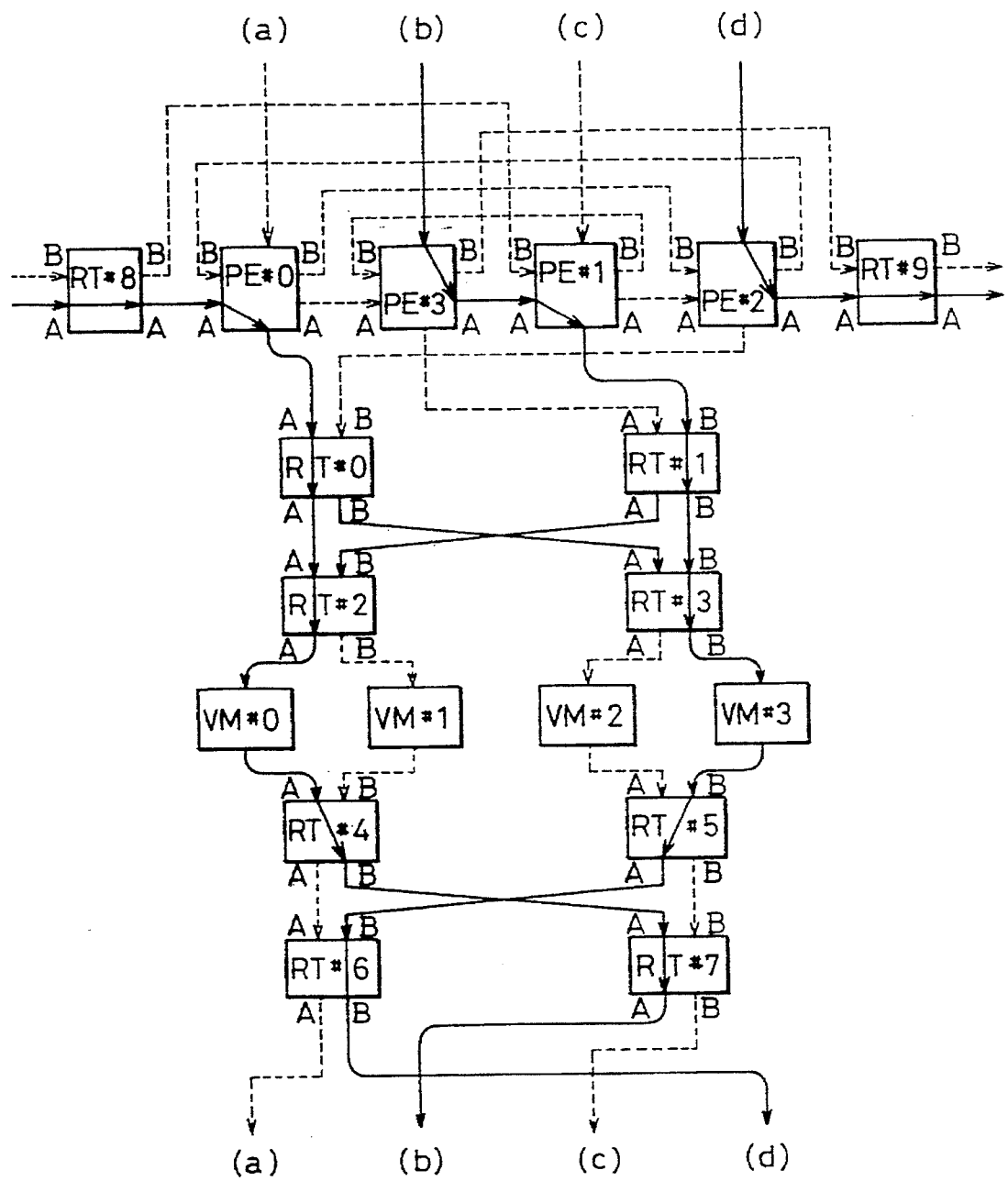
FIG. 24 is a diagram showing a transmission path for a datapacket storing an ID verification instruction code when the system in FIG. 20 is a 4VM system.

FIG. 24 illustrates a transmission path for a datapacket when the system in FIG. 20 is a 4VM system and 2-bit switch signals (SW1, SW0) are set to (1, 0). One can readily confirm that the transmission path can be implemented as shown. As shown in FIG. 24, simply setting switch signals (SW1, SW0) to (1, 0) allows datapacket P to be transmitted through a path written with a stroke of line passing through all the processors within the 4VM system.

As in the foregoing, if a datapacket storing identification data verification instruction information destined to a desired processor is input to a data driven information processing system according to the invention, a datapacket storing identification data predetermined for the desired processor is output. Checking the identification data in the datapacket permits whether or not the identification data is correctly set for the desired processor in the system to be known. Thus, operation testing for the system can be simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a data driven information processing system having an input and an output for a datapacket and including processors for processing a datapacket, and interconnections providing a plurality of paths through said processors between said input and said output, said processors having identification information stored therein, a plurality of input ports and a plurality of output ports, and means for dynamically selecting one of the output ports, a computer-implemented method of verifying that identification information allocated to said processors actually corresponds to the identification information stored in the processors comprising the computer implemented steps of:

a) previously specifying a path for a datapacket via said processors from said input to a desired processor;

b) applying, to said data driven information processing system at said input, a datapacket which stores log information specifying a total number of processors encountered by said datapacket along the path leading toward the desired processor and which stores a predetermined identification data verification instruction, the log information having been initialized to a preset value prior to the step b);

c) a first transmission step of transmitting said datapacket along said specified path toward said desired processor while updating the log information in the datapacket indicating a number of processors encountered along said path, a processor being recognized as the desired processor as a function of the log information in the datapacket;

d) producing a result datapacket, after a processor has been recognized as the desired processor, which stores the identification information read from said desired processor;

e) of the data driven information processing system; and f) comparing said identification information stored in said result datapacket with reference identification information allocated to the desired processor, thereby ensuring that the identification information actually stored in the desired processor corresponds to the reference identification information allotted thereto.

2. A method as recited in claim 1, wherein said plurality of processors each has identification data uniquely set therefor.

3. A method as recited in claim 2, wherein said path is fixed; and said specifying step includes a step of previously specifying said path so as to pass through all said plurality of processors within said data driven information processing system.

4. A method as recited in claim 3, further comprising a step of previously setting selection of output ports by said plurality of processors so that the datapacket which stores said identification data verification instruction is transmitted along said previously specified path.

5. A method as recited in claim 4, wherein said plurality of processors each include signal generation means for generating a signal which can be externally set and take a plurality of values;

means for identifying said identification data verification instruction in an applied datapacket;

means for selecting an output determined by the output of said signal generation means in response to said identification data verification instruction being identified; and means for outputting said result datapacket at said selected output, and said step of previously setting a path includes a step of previously setting the value of the signal generated by said signal generation means in all said plurality of processors to such values that said specified path is formed.

6. A method as recited in claim 2, further comprising a step of setting selection of an output port in said plurality of processors so that said datapacket for identification is transmitted along said specified path.

7. A method as recited in claim 6, wherein each said plurality of processors includes: signal generation means for generating a signal which can be externally set and take a plurality of values;

means for identifying said identification data verification instruction in an applied datapacket;

means for selecting an output port determined by the output of said signal generation means in response to said identification data verification instruction being identified; and means for outputting a datapacket at said selected output port, and said step of setting selection of an output port in said processors includes a step of setting the value of the signal generated by said signal generation means in processors forming said specified path among said plurality of processors such that said specified path is formed.

8. A method as recited in claim 6, wherein each said plurality of processors includes:

first signal generation means for generating a first signal which can be externally set and take a plurality of values;

means for identifying said identification data verification instruction in an applied datapacket;

means for selecting an output port determined by said first signal, in response to said identification data verification instruction being identified; and means for outputting a datapacket at said selected output port, and said system further includes second signal generation means capable of generating a second signal which can take a plurality of values, said method includes:

a step of previously specifying a plurality of paths;

a step of specifying a setting for each of a plurality of said first signal generation means, thereby providing each of specified said plurality of paths;

a step of associating said specified plurality of paths and said plurality of values for said second signal with each other, and said step of setting selection of an output port in each said plurality of processors includes, a step of selecting one of said specified plurality of paths and a step of setting the output of said second signal generation means to said value selected and associated with the paths.

9. A method as recited in claim 2, wherein said first transmission step includes:

a first determination step of determining whether or not an applied datapacket is said data verification instruction in a certain processor; and a step of selectively executing a predetermined first processing or a predetermined second processing in response to a result of determination by said first determination step in said certain processor, said first processing includes, an updating step of decrementing said processor number information by 1, a second determination step of determining whether or not said processor number information of said datapacket for determination is 0, and a step of selectively executing a processing of completing said first transmission step and a processing of transmitting said datapacket for determination to a succeeding processor through said set path, depending upon a result of determination by said second determination step, said second processing includes, a step of subjecting an applied datapacket to a processing determined by a normal instruction and producing a result datapacket, in response to said normal instruction being identified, and a step of selecting an output port determined by the content of said result datapacket and outputting said produced result datapacket at the output port, and said first transmission step further includes a step of repeating said first determination step and said selectively executing step in relevant said processors until said processor number information is determined to be 0 in said second determination step.

10. A method as recited in claim 9, wherein said processor number information includes a value indicating a position occupied by a desired processor among a series of processors in said specified path and the number of processors said datapacket for identification has reached in said specified path, said updating step of decrementing said processor number information by 1 includes a step of incrementing said number of processors said datapacket for identification has reached by 1, and said second determination step includes a step of comparing said number of processors said datapacket for identification has reached and the value indicating the position occupied by said desired processor, and determining that said processor number information is 0 if they are in agreement.

11. In an information processing system in which datapackets are passed between a plurality of processors, a computer-implemented method of verifying that identification information allocated to a desired one of the plurality of processors actually corresponds to identification information stored therein, a datapacket including a count field for storing a count of a number of processors encountered by the datapacket and an identification field for storing an identification number received from the desired processor, comprising the computer-implemented steps of:

(a) selecting a path through the plurality of processors to the desired processor;

(b) receiving a datapacket at an input to the system, a value of the count field of the datapacket having been initialized to a preset value;

(c) transmitting the datapacket to an $i^{th}$ processor on the path;

(d) adjusting, while the datapacket is in the $i^{th}$ processor, the value in the count field of the datapacket;

(e) comparing, while the datapacket is in the $i^{th}$ processor, the then-adjusted value in the count field with a reference value; and (f) copying, if the value in the count field equals the reference value thereby indicating that the $i^{th}$ processor is the desired processor, identification information of the $i^{th}$ processor into the identification field of the datapacket;

(g) outputting, after the datapacket has reached the desired processor, the datapacket from the desired processor;

(h) comparing the identification information of the desired processor stored in the datapacket with reference identification information allocated to the desired processor, thereby ensuring that the identification information actually stored in the desired processor corresponds to the reference identification information allotted thereto.

12. A method as in claim 11, wherein:

a datapacket further includes a reference field for storing the reference value;

the reference value corresponds to a number of processors on the path between an input to the system and a desired processor plus one;

the preset value of the count field equals zero;

the step (d) adjusts by incrementing the value in the count field.

13. A method as in claim 11, wherein:

the preset value of the count field equals a number of processors on the path between an input to the system and a desired processor plus one;

the reference value equals zero; and the step (d) adjusts by decrementing the value in the count field.

14. A method as in claim 11, wherein:

the path through the plurality of processors passes through each processor only once.

15. A method as in claim 11, wherein: the path is a fixed path.

16. An apparatus for configuring datapackets to enable verification that identification information allocated to a desired processor corresponds to actual identification information stored therein, the apparatus operating within an information processing system including a plurality of processors of which datapackets are passed therebetween, a datapacket including a count field for storing a count of a number of processors encountered by the datapacket and an identification field for storing an identification number received from the desired processor, comprising:

presetting means for presetting a value of the count field of a datapacket;

means for selecting a path through the plurality of processors;

input means, responsive to the presetting means, for receiving a datapacket as an input to the information processing system, a value of the count field of the received datapacket having been initialized previously to a preset value:

means for transmitting the datapacket to an $i^{th}$ processor on the path;

each processor including:
  means for adjusting the value in the count field of a datapacket held therein; and
  means, responsive to the means for adjusting, for comparing the then-adjusted value in the count field with a reference value; and
  means for copying, responsive to the means for comparing, if the value in the count field equals the reference value thereby indicating that the processor is the desired processor, identification information of the processor into the identification field of the datapacket;

means for receiving the datapacket from the desired processor;

comparison means, responsive to the means for receiving, for comparing the identification information of the desired processor stored in the datapacket with reference identification information allocated to the desired processor, thereby ensuring that the identification information actually stored in the desired processor corresponds to the reference identification information allotted thereto.

17. An apparatus as in claim 16, wherein:

a datapacket further includes a reference field for storing the reference value;

the reference value corresponds to a number of processors on the path between an input to the system and a desired processor plus one;

the preset value of the count field equals zero;

the means for adjusting adjusts by incrementing the value in the count field.

18. An apparatus as in claim 16, wherein:

the preset value of the count field equals a number of processors on the path between an input to the system and a desired processor plus one;

the reference value equals zero; and the means for adjusting adjusts by decrementing the value in the count field.

19. An apparatus as in claim 16, wherein:

the path through the plurality of processors passes through each processor only once.

20. An apparatus as in claim 16, wherein: the path is a fixed path.

* * * * *